United States Patent
Atsuumi et al.

(10) Patent No.: US 8,982,474 B2
(45) Date of Patent: Mar. 17, 2015

(54) ZOOM LENS AND INFORMATION DEVICE

(71) Applicants: Hiromichi Atsuumi, Yokohama (JP); Yohei Takano, Yokohama (JP)

(72) Inventors: Hiromichi Atsuumi, Yokohama (JP); Yohei Takano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 13/687,373

(22) Filed: Nov. 28, 2012

(65) Prior Publication Data
US 2013/0135751 A1 May 30, 2013

(30) Foreign Application Priority Data

Nov. 30, 2011 (JP) .................................. 2011-262512
Nov. 30, 2011 (JP) .................................. 2011-262799

(51) Int. Cl.
*G02B 15/14* (2006.01)
*G02B 9/00* (2006.01)
*G02B 9/60* (2006.01)
*G02B 13/18* (2006.01)

(52) U.S. Cl.
CPC ...... *G02B 15/14* (2013.01); *G02B 9/60* (2013.01); *G02B 13/18* (2013.01)
USPC ........... 359/683; 359/754; 359/764; 359/765; 359/714

(58) Field of Classification Search
CPC .... G02B 15/16; G02B 15/163; G02B 15/167; G02B 15/17; G02B 15/14; G02B 13/18; G02B 9/60
USPC ......... 359/676, 683–685, 688, 791, 714, 754, 359/764; 348/345
See application file for complete search history.

(56) References Cited

U.S. PATENT DOCUMENTS

| | | | | | |
|---|---|---|---|---|---|
| 5,606,459 | A | * | 2/1997 | Nakatsuji | 359/683 |
| 5,946,145 | A | * | 8/1999 | Ohtake | 359/791 |
| 6,002,527 | A | * | 12/1999 | Ohtake | 359/683 |
| 6,055,114 | A | * | 4/2000 | Ohtake | 359/676 |
| 6,166,863 | A | * | 12/2000 | Ohtake | 359/676 |
| 6,215,599 | B1 | * | 4/2001 | Ohtake | 359/688 |
| 6,236,516 | B1 | | 5/2001 | Misaka | |
| 2009/0073572 | A1 | | 3/2009 | Atsuumi | |
| 2009/0122418 | A1 | | 5/2009 | Atsuumi et al. | |
| 2009/0135500 | A1 | | 5/2009 | Sudoh et al. | |
| 2009/0147375 | A1 | | 6/2009 | Sudoh et al. | |
| 2010/0091170 | A1 | * | 4/2010 | Miyazaki et al. | 348/345 |
| 2010/0091173 | A1 | * | 4/2010 | Miyazaki et al. | 348/345 |

(Continued)

FOREIGN PATENT DOCUMENTS

| | | |
|---|---|---|
| JP | 10-48518 | 2/1998 |
| JP | 11-160621 A | 6/1999 |
| JP | 4401451 | 11/2009 |

OTHER PUBLICATIONS

Extended European Search Report issued Feb. 15, 2013, in European patent Application No. 12194878.0.

*Primary Examiner* — Suchin Parihar
*Assistant Examiner* — Collin X Beatty
(74) *Attorney, Agent, or Firm* — Oblon, McClelland, Maier & Neustadt, L.L.P.

(57) ABSTRACT

A zoom lens includes, in order from an object side to an image side along an optical axis, a first lens group having a positive refractive power, a second lens group having a negative refractive power, a third lens group having a negative refractive power, a fourth lens group having a positive refractive power, and a fifth lens group having a positive refractive power.

19 Claims, 16 Drawing Sheets

(56) References Cited

U.S. PATENT DOCUMENTS

| | | |
|---|---|---|
| 2010/0091174 A1* | 4/2010 | Miyazaki et al. ............. 348/345 |
| 2010/0238565 A1 | 9/2010 | Takano et al. |
| 2011/0002047 A1 | 1/2011 | Takano et al. |
| 2011/0002048 A1 | 1/2011 | Takano et al. |
| 2011/0109978 A1* | 5/2011 | Yamada et al. ............... 359/684 |
| 2012/0008216 A1 | 1/2012 | Takano et al. |
| 2012/0236419 A1* | 9/2012 | Atsuumi et al. .............. 359/683 |
| 2012/0307375 A1 | 12/2012 | Takano et al. |
| 2013/0033759 A1 | 2/2013 | Takano et al. |
| 2013/0222922 A1* | 8/2013 | Atsuumi et al. .............. 359/683 |

* cited by examiner

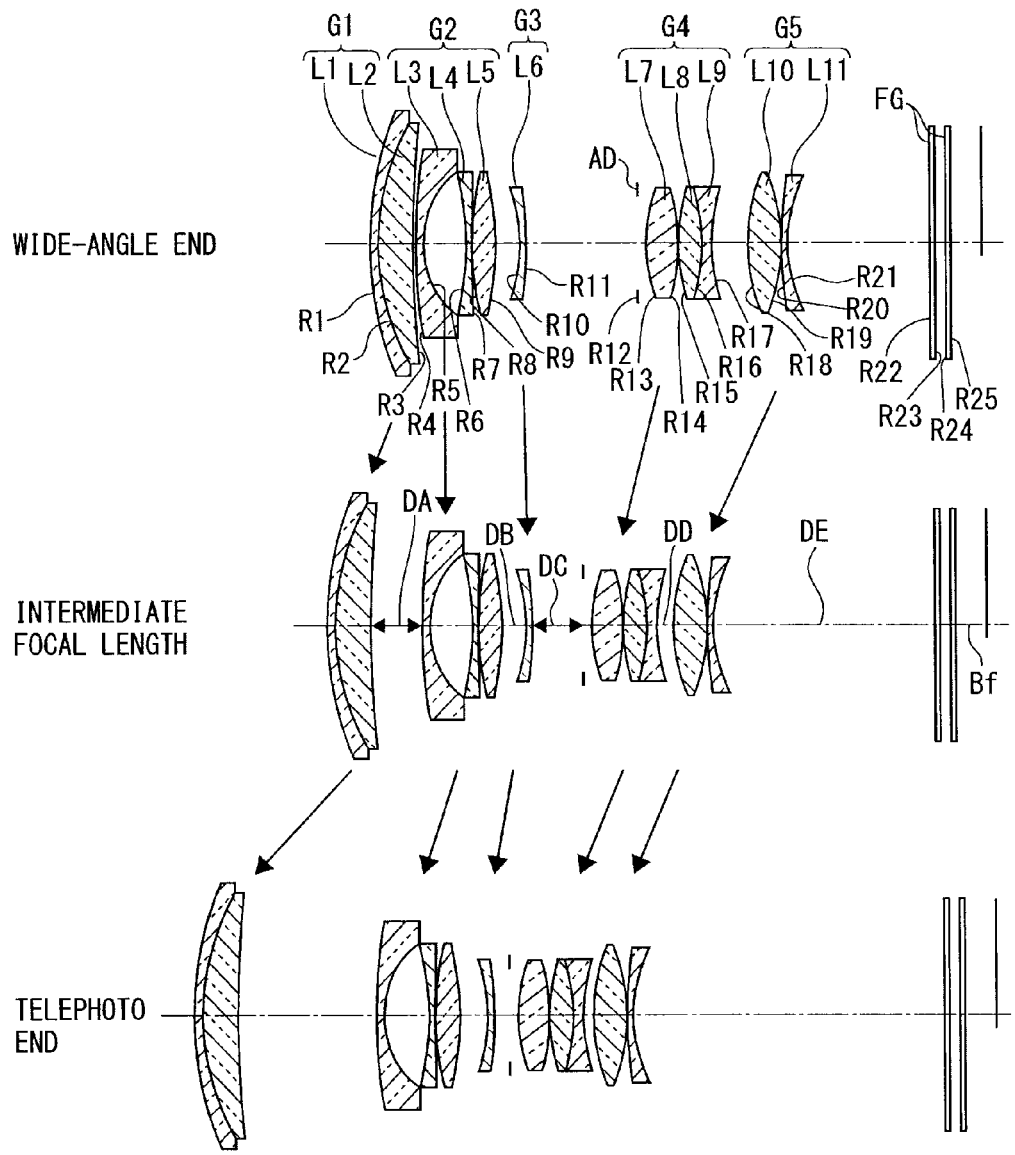

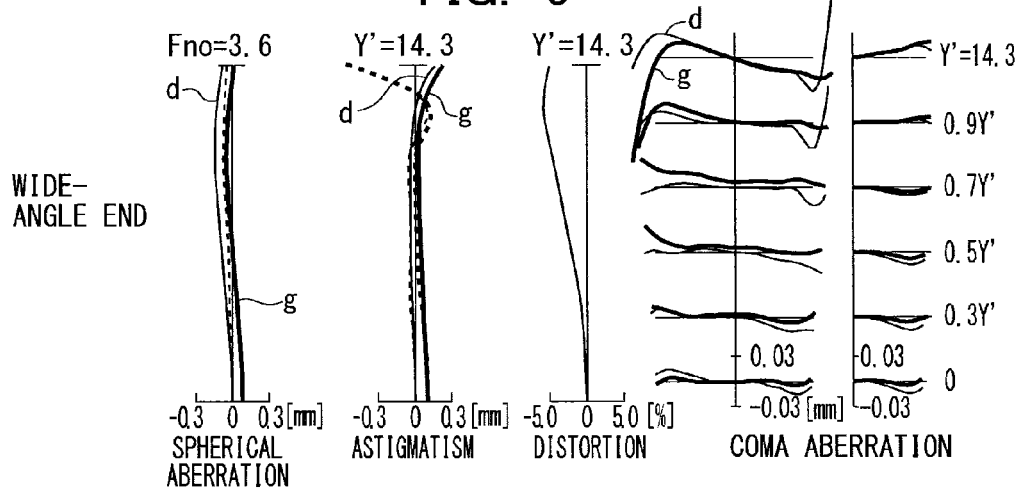
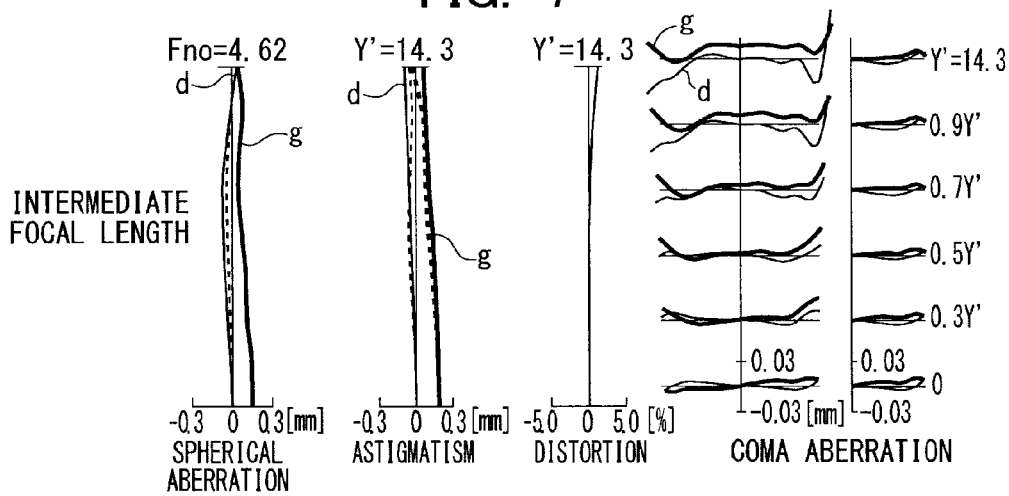
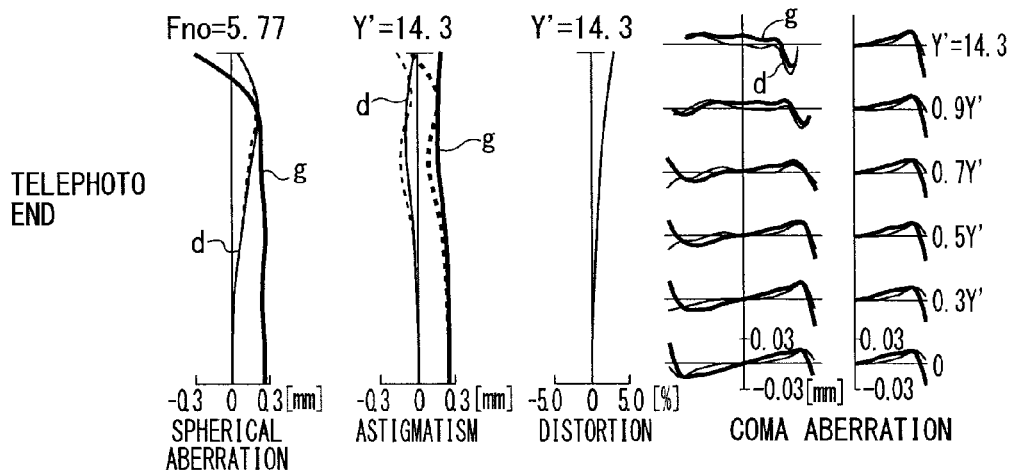

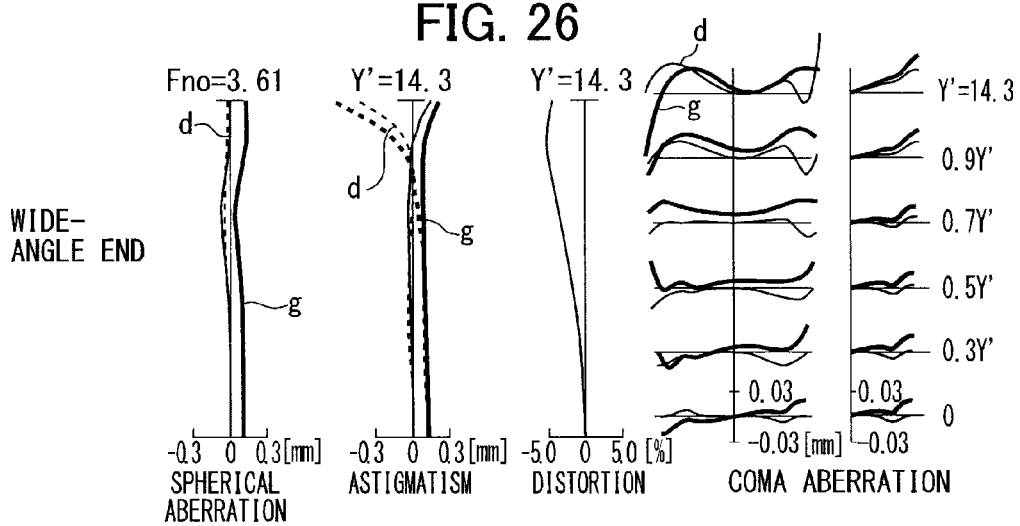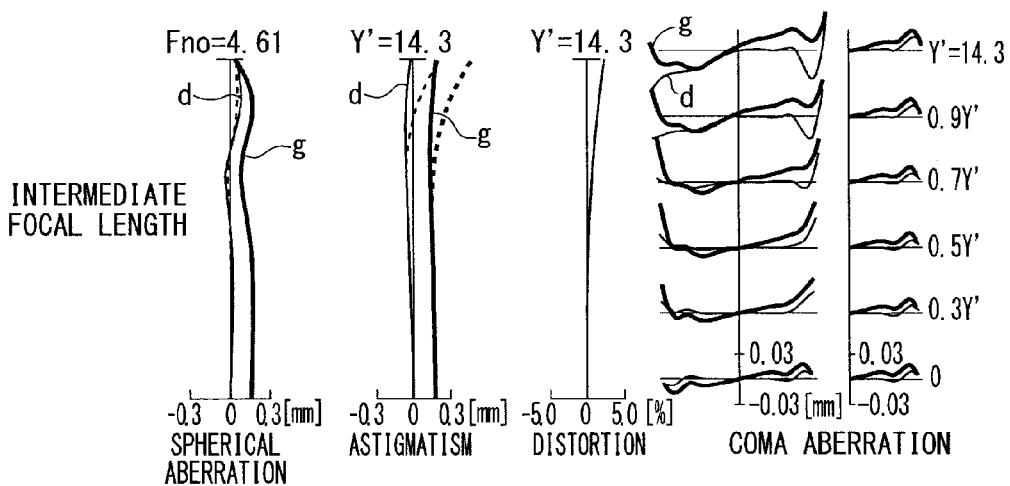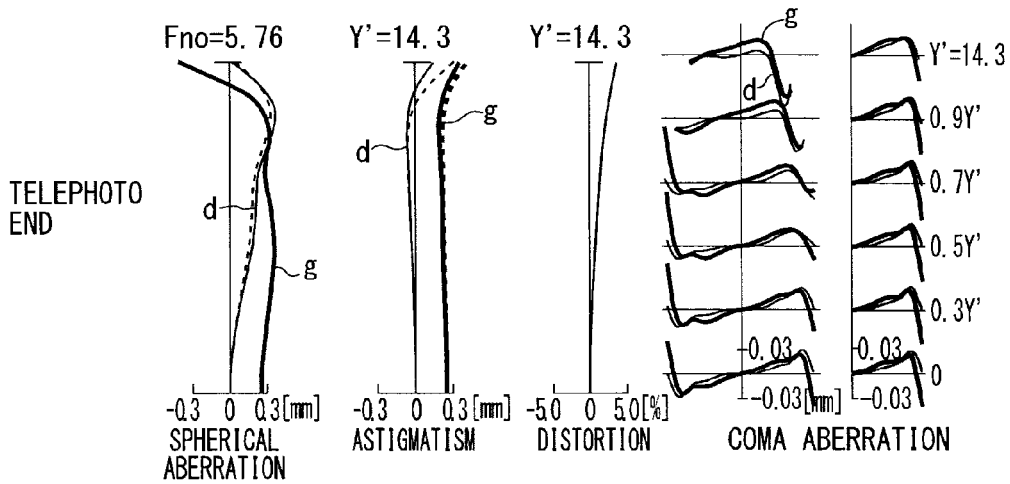

ZOOM LENS AND INFORMATION DEVICE

PRIORITY CLAIM

The present application is based on and claims priority from Japanese Patent Application No. 2011-262512, filed on Nov. 30, 2011 and Japanese Patent Application No. 2011-262799, field on Nov. 30, 2011, the disclosures of which are hereby incorporated by reference in their entirety.

BACKGROUND

1. Field of the Invention

The present invention relates to a zoom lens and an information device.

The zoom lens of the present invention can be used as a zoom lens in an imaging device such as a digital camera, film camera, video camera or digital video camera. The information device of the present invention can be used as a digital camera, personal digital assistant or the like.

2. Description of the Related Art

In recent years, a high-performance and compact digital camera has been in demand.

A further increased auto-focusing (hereinafter, referred to as AF) speed has also been in demand in recent years in which the AF is the most common focusing.

In order to downsize the zoom lens, it is necessary to reduce the entire length (the distance from the most object side lens surface to the image plane) of the lenses when used.

Inner focusing or rear focusing which moves a compact and lightweight lens group has been the mainstream AF of the zoom lens in recent years, which enables an AF speed to be increased. However, it is necessary to downsize the focus lens in order to further increase an AF speed.

Considering the application to a high-end digital camera, it is necessary to have a resolution corresponding to an imaging element having at least ten million pixels over the entire zoom area.

As will become apparent below, the zoom lens of the present invention has five lens groups of positive, negative, negative, positive and positive, and is configured to perform focusing by displacing the third lens group. Patent Document 1 (Japanese Patent Publication No. 3716418) and Patent Document 2 (Japanese Patent Publication No. 4401451) disclose a zoom lens which performs focusing by displacing the third lens group of an inner lens group.

Patent Document 1 discloses a specific embodiment in which a zoom lens having five lens groups of positive, negative, negative, positive and positive performs focusing by displacing the third lens group as a focusing group.

However, in the zoom lens disclosed in Patent Document 1, the third lens group of the focusing lens is a large and heavy cemented lens of negative and positive lenses. For this reason, a load for moving the third lens group is increased, and a large driving force is required for achieving high-speed focusing; thus, a driving motor or the like may be increased in size.

The zoom lens of Embodiment 4 in Patent Document 2 includes five lens groups of positive, negative, negative, positive and positive, and is configured to perform the focusing with the third lens group as the focusing group. However, the third lens group of the focusing lens includes a large and heavy configuration having three lenses of negative, positive and negative. For this reason, a load for moving the focusing group is increased, and a large driving force is required for achieving high-speed focusing; thus, a driving motor or the like may be increased in size.

SUMMARY

The present invention has been made in view of the above circumstances, and an object of the present invention is to provide a zoom lens which is suitable as a zoom lens for a high-performance and compact digital camera, can increase an AF speed, downsize a driving system for AF, and achieve a resolution corresponding to an imaging element having more than ten million pixels, and also an information device using such a zoom lens.

In order to achieve the above object, one embodiment of the present invention provides a zoom lens, including: in order from an object side to an image side along an optical axis, a first lens group having a positive refractive power; a second lens group having a negative refractive power; a third lens group having a negative refractive power; a fourth lens group having a positive refractive power; a fifth lens group having a positive refractive power; and an aperture stop between the third and fourth lens groups, wherein all of the lens groups are moved such that, in the case of changing a magnification from a wide-angle end to a telephoto end, an interval between the first and second lens groups is increased, an interval between the second and third lens groups is increased, an interval between the third and fourth lens groups is decreased, and an interval between the fourth and fifth lens groups is decreased, the focusing is performed by displacement of the third lens group, the third lens group includes one negative lens, at least one aspheric surface is provided on the object side of the aperture stop and the image side of the aperture stop, and an entire optical length at the telephoto end Lt, a maximum distortion at the wide-angle end Disw, an image height Y', a focal length of the entire system at the wide-angle end Fw, a focal length of the entire system at the telephoto end Ft, a geometric average of Fw and Ft Fm $\{=\sqrt{(Fw \times Ft)}\}$, and a maximum effective diameter of a lens $\phi$ satisfy the following conditions (1), (2).

$$0.01 < |(Lt \times Disw)/(Y' \times Fm)| < 0.02 \tag{1}$$

$$0.001 < |(\phi \times Disw)/(Y' \times Fm)| < 0.01 \tag{2}$$

One embodiment of the present invention also provides a zoom lens, including: in order from an object side to an image side along an optical axis, a first lens group having a positive refractive power; a second lens group having a negative refractive power; a third lens group having a negative refractive power; a fourth lens group having a positive refractive power; and a fifth lens group having a positive refractive power, wherein in the case of changing a magnification from the wide-angle end to the telephoto end, an interval between the first and second lens groups is gradually increased, an interval between the second and third lens groups is changed, an interval between the third and fourth lens groups is gradually decreased, and an interval between the fourth and fifth lens groups is gradually decreased, the focusing is performed by the third lens group, and the following condition (3) is satisfied where a displacement of the first lens group from the wide-angle end to the intermediate focal length Fm is Twm and a displacement of the first lens group from the wide-angle end to the telephoto end is Twt, in this case, the intermediate focal length Fm is Fm=$\sqrt{(Fw \times Ft)}$ where a focal length at the wide-angle end is Fw and a focal length at the telephoto end is Ft.

$$0.1 < Twm/Twt < 0.4 \tag{3}$$

One embodiment of the present invention also provides a zoom lens, including: in order from an object side to an image side along an optical axis, a first lens group having a positive refractive power; a second lens group having a negative refractive power; a third lens group having a negative refractive power; a fourth lens group having a positive refractive power; and a fifth lens group having a positive refractive power, wherein all of the lens groups are moved such that, in the case of changing a magnification from the wide-angle end to the telephoto end, an interval between the first and second lens groups is increased, an interval between the second and third lens groups is increased, an interval between the third and fourth lens groups is decreased, and an interval between the fourth and fifth lens groups is decreased, the focusing is performed by displacement of the third lens group, and an entire optical length at the telephoto end Lt, a maximum distortion at the wide-angle end Disw, an image height Y', a focal length of the entire system at the wide-angle end Fw, a focal length of the entire system at the telephoto end Ft, an intermediate focal length Fm=√(Fw×Ft), and a maximum effective diameter of a lens φ satisfy the following conditions (1), (2).

$$0.01 < |(Lt \times Disw)/(Y' \times Fm)| < 0.02 \quad (1)$$

$$0.001 < |(\varphi \times Disw)/(Y' \times Fm)| < 0.01 \quad (2)$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 5 is a sectional view illustrating the constitution of a zoom lens in Example 2 according to the first, second, and fourth embodiments of the present invention.

FIG. 6 is an aberration curve view at the wide-angle end of the zoom lens in Example 2.

FIG. 7 is an aberration curve view at the intermediate focal length of the zoom lens in Example 2.

FIG. 8 is an aberration curve view at the telephoto end of the zoom lens in Example 2.

FIG. 26 is an aberration curve view at the wide-angle end of the zoom lens in Example 7.

FIG. 27 is an aberration curve view at the intermediate focal length of the zoom lens in Example 7.

FIG. 28 is an aberration curve view at the telephoto end of the zoom lens in Example 7.

DESCRIPTION OF THE PREFERRED EMBODIMENTS

Figure 1:
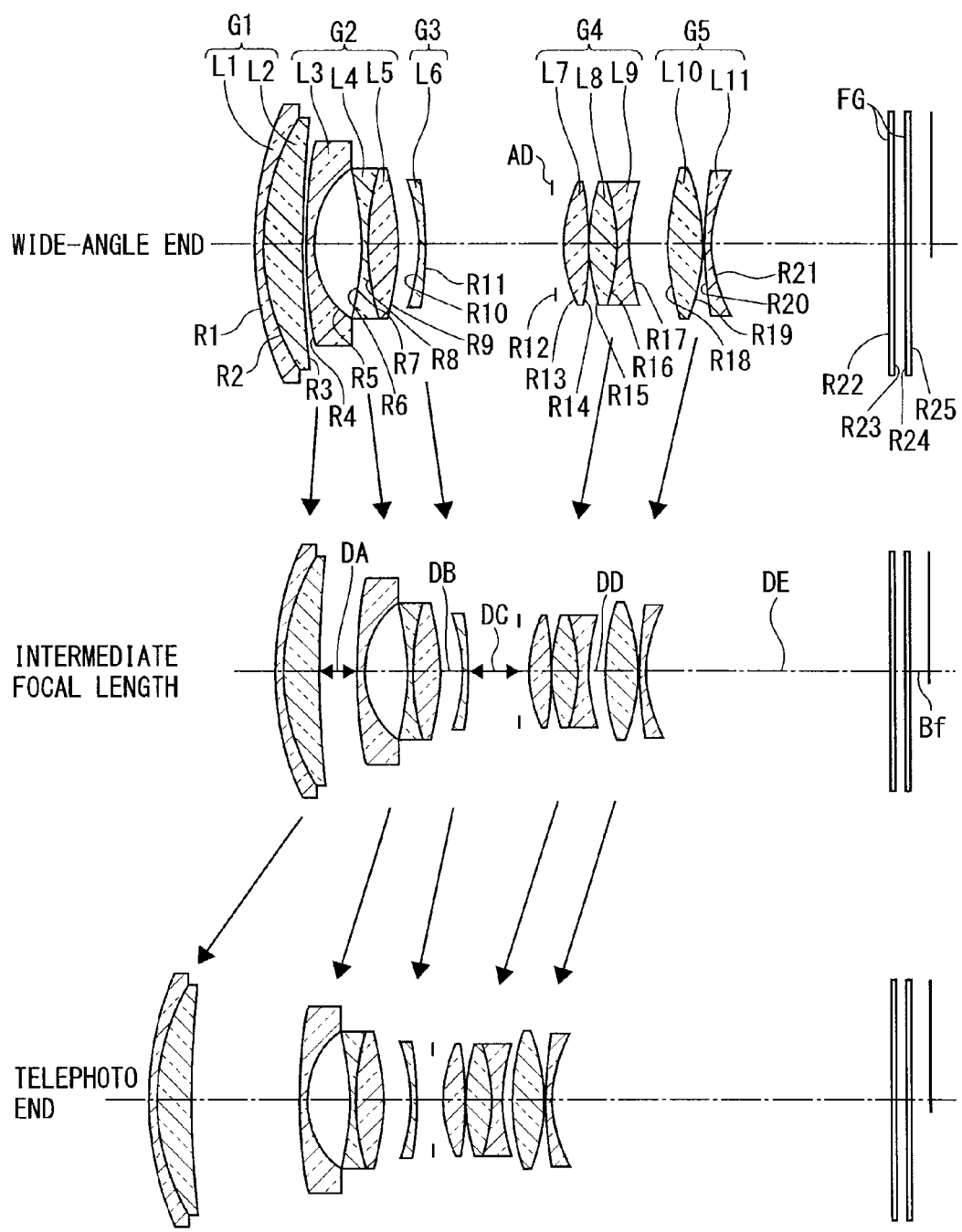
FIG. 1 is a sectional view illustrating the constitution of a zoom lens in Example 1 according to the first, second and fourth embodiments of the present invention.

A zoom lens according to a first embodiment of the present invention includes five lens groups of positive, negative, negative, positive, and positive, and an aperture stop between the third and fourth lens groups.

In the case of changing a magnification from the wide-angle end to the telephoto end, all of the lens groups are moved such that the interval between the first and second lens groups is increased, the interval between the second and third lens groups is increased, the interval between the third and fourth lens groups is decreased, and the interval between the fourth and fifth lens groups is decreased, and the focusing is performed by the displacement of the third lens group.

The third lens group of the focusing lens includes one negative lens. The zoom lens according to the first embodiment of the present invention includes at least one aspheric surface on the object side of the aperture stop and the image side of the aperture stop, and satisfies the following conditions (1), (2) where an entire optical length at the telephoto end is Lt, a maximum distortion at the wide-angle end is Disw, an image height is Y', a focal length of the entire system at the wide-angle end is Fw, a focal length of the entire system at the telephoto end is Ft, a geometric average of Fw and Ft is Fm {=√(Fw×Ft)}, and a maximum effective diameter of a lens is φ.

$$0.01 < |(Lt \times Disw)/(Y' \times Fm)| < 0.02 \quad (1)$$

$$0.001 < |(\varphi \times Disw)/(Y' \times Fm)| < 0.01 \quad (2)$$

The third lens group of the focusing lens has one lightweight negative lens, which enables high-speed focusing by a small driving force with a small driving motor.

The aspheric surface provided on the object side of the aperture stop is effective for correcting aberration, in particular, distortion, reducing the optical entire length of the zoom lens and the effective diameter of the lens, and downsizing an information device.

The deterioration in the aberration such as field curvature in the focusing due to the movement of the third lens group is effectively controlled by the aspheric surface provided on the object side of the aperture stop.

The aspheric surface provided on the image side of the aperture stop is effective for correcting aberration, in particular, spherical aberration and filed curvature, reducing the optical entire length of the zoom lens and the effective diameter of the lens, and downsizing a camera or information device such as a personal digital assistant.

The conditions (1), (2) are conditions which preferably correct distortion or the like, so as to downsize the zoom lens.

If the parameter falls below the lower limit value of 0.01 of the condition (1), it becomes difficult to correct the aberration such as distortion, or it becomes difficult to improve a production performance because manufacturing error sensitivity is increased.

If the parameter exceeds the upper limit value of 0.02 of the condition (1), the entire length of the lenses is increased, resulting in an increase in size of a camera or personal digital assistant. By satisfying the condition (1), the entire optical length and the optical property such as distortion can be well balanced.

If the parameter falls below the lower limit value of 0.001 of the condition (2), similar to the condition (1), it becomes difficult to correct the aberration such as distortion, resulting in difficulty in improving a production performance because manufacturing error sensitivity is increased.

If the parameter exceeds the upper limit value of 0.01 of the condition (2), the maximum effective diameter $\phi$ of a lens in the lenses constituting the zoom lens is increased, resulting in an increase in size of a camera, personal digital assistant or the like.

By satisfying the condition (2), the maximum effective diameter $\phi$ of the lens and the optical property such as distortion can be well balanced.

It is preferable to use the aspheric surface in the second lens group as the aspheric surface provided on the object side of the aperture stop, and also to use the aspheric surface in the fourth and fifth lens groups as the aspheric surface provided on the image side of the aperture stop.

The use of the aspheric surface in the second lens group is effective for correcting the aberration, in particular, distortion, effective for reducing the entire optical length of the zoom lens and the effective diameter of the lens, and downsizing a camera or an information device such as a personal digital assistant.

The use of the aspheric surface in the fourth lens group is effective for correcting the aberration, in particular, spherical aberration, reducing the entire optical length of the zoom lens and the effective diameter of the lens, and downsizing a camera or an information device such as a personal digital assistant.

The use of the aspheric surface in the fifth lens group is effective for correcting the aberration, in particular, filed curvature, reducing the optical entire length of the zoom lens and the effective diameter of the lens, and downsizing a camera or an information device such as a personal digital assistant.

By using the aspheric surface in the second, fourth and fifth lens groups as described above, the deterioration in the field curvature due to the focusing can be preferably controlled.

FIGS. 1, 5, 9, 13, 17, 21, 25 illustrate the embodiments of the zoom lenses. The zoom lenses illustrated in these figures correspond to the zoom lenses in the after-described Examples 1-7.

In each of these figures, the upper view illustrates the lens group arrangement at the wide-angle end, the middle view illustrates the lens group arrangement at the intermediate focal length, and the lower view illustrates the lens group arrangement at the telephoto end.

The arrows illustrate the displacement of the respective lens groups in the case of changing a magnification from the wide-angle end to the telephoto end.

The same reference numbers are applied in each figure for the purpose of simplifying the description.

Namely, the zoom lens of each of these embodiments includes, in order from the object side (left side in figures) to the image side (right side in figures) along the optical axis, a first lens group having a positive refractive power, a second lens group having a negative refractive power, a third lens group having a negative refractive power, a fourth lens group having a positive refractive power, a fifth lens group having a positive refractive power and an aperture stop AD between the third lens group and the fourth lens group.

In the case of changing a magnification from the wide-angle end to the telephoto end, the interval between the first and second lens groups is increased, the interval between the second and third lens groups is increased, the interval between the third and fourth lens groups is decreased, and the interval between the fourth and fifth lens groups is decreased. The aperture stop AD moves together with the fourth lens group.

The increase in the interval between the lens groups in the case of changing a magnification from the wide-angle end to the telephoto end is not always limited to a monotonic increase. It includes a case in which the interval between lens groups at the telephoto end is increased to be larger than that at the wide-angle end by a decrease when changing a magnification from the wide-angle end to the intermediate focal length, and then an increase when changing a magnification to the telephoto end. In the following Examples, the interval between the second and third lens groups may change as in the above case.

The focusing is performed by the displacement of the third lens group.

The third lens group includes one negative lens.

In each figure, reference number FG on the right side of the figure denotes two transparent parallel plates.

In a camera device, for example, a digital still camera using an imaging element such as a CCD or CMOS, a low pass filter, infrared light cut glass or the like is provided close to the light-receiving surface of the imaging element, and the light-receiving surface of the imaging element is covered by a cover glass.

The above-described transparent parallel plates are transparent parallel plates in which various filters such as a low pass filter or a cover glass are virtually substituted by two transparent parallel plates optically equivalent to those filters or cover glass.

An image plane is located on the image side of the transparent parallel plates FG. This image plane conforms to the light-receiving surface of the imaging element.

The zoom lens is not limited to be used together with the imaging element. It can be used as an imaging lens of a film camera. In this case, the image plane conforms to a photosensitive surface of a silver film, and the transparent parallel plates FG are not used.

Hereinafter, a second embodiment of the present invention will be described.

The second embodiment of the present invention relates to an embodiment as a zoom lens.

The zoom lens according to the second embodiment of the present invention includes, in order from the object side to the image side along the optical axis, a first lens group having a positive refractive power, a second lens group having a negative refractive power, a third lens group having a negative refractive power, a fourth lens group having a positive refractive power and a fifth lens group having a positive refractive power.

In the zoom lens in which, in the case of changing the magnification from the wide-angle end (short focal end) to the telephoto end (long foal end), the interval between the first and second lens groups is gradually increased, the interval between the second and third lens groups is changed, the interval between the third and fourth lens groups is gradually decreased, the interval between the fourth and fifth lens groups is gradually decreased, and the focusing is performed by moving the third lens group, the following condition (3) is satisfied.

$$0.1 < Twm/Twt < 0.4 \tag{3}$$

In this case, Twm is a displacement of the first lens group from the wide-angle end to the intermediate focal length Fm and Twt is a displacement of the first lens group from the wide-angle end to the telephoto end. The intermediate focal length Fm is obtained by $Fm=\sqrt{(Fw \times Ft)}$ where the focal length at the wide-angle end is Fw and the focal length at the telephoto end is Ft.

If Twm/Twt of the condition (3) falls below the lower limit value of 0.1, the displacement of the first lens group from the wide-angle end to the intermediate focal length Fm becomes too small, and it becomes especially difficult to correct aberration at the intermediate focal length Fm. It also becomes difficult to increase a magnification due to such difficult correction.

On the other hand, if Twm/Twt of the condition (3) exceeds the upper limit value of 0.4, the entire length of the optical system is reduced, and it becomes difficult to correct the aberration. It becomes necessary to reduce the entire length of the optical system at the wide-angle end relative to the entire length of the optical system at the telephoto end, and it becomes especially difficult to correct aberration at the wide-angle end.

Accordingly, by satisfying the condition (3), the entire length of the optical system at each zoom position and the optical property can be well balanced.

It is preferable to dispose the aperture stop between the third lens group and the fourth lens group in the above zoom lens. By specifying the arrangement of the aperture stop in this way, the lens constitution of the above zoom lens can be effective. In this case, the aperture stop can be moved independently of the third and fourth lens groups so as to avoid the interference with these lens groups, or can be moved together with the third lens group. It is preferable to move the aperture stop together with the fourth lens group.

It is preferable for the first lens group to monotonically move in accordance with a change in a magnification from the wide-angle end to the telephoto end. By this monotonic movement of the first lens group in accordance with a change in a magnification from the wide-angle end to the telephoto end, the magnification can be further effectively changed, and the displacement of the each lens group and the entire length of the optical system in the case of changing a magnification can be reduced.

It is preferable for the third lens group having a focusing function to include a single negative lens in the above zoom lens. By satisfying the above requirement, the aberration due to the focusing is not deteriorated even if the third lens group as the focus group is constituted by a single negative lens, and the focus group can be downsized and the auto-focusing (AF) speed can be increased by constituting the third lens group with a single negative lens.

It is preferable for one or more lens constituting at least one of the second, fourth and fifth lens groups to have an aspheric surface.

The aspheric surface provided in the second lens group is effective for correcting aberration, in particular, distortion, and also contributes to the reduction in the entire length of the optical system, the downsizing by the reduction in the effective diameter of the lens and the downsizing of the camera. The aspheric surface provided in the fourth lens group is effective for correcting aberration, in particular, spherical aberration, and contributes to the reduction in the entire length of the optical system, the downsizing by the reduction in the effective diameter of the lens and the downsizing of the camera. Moreover, the deterioration in field curvature due to the focusing can also be controlled. The aspheric surface provided in the fifth lens group is effective for correcting the aberration, in particular, field curvature, and contributes to the reduction in the entire length of the optical system, the downsizing by the reduction in the effective diameter of the lens and the downsizing of the camera.

With the above-described constitution, a compact and aberration-corrected zoom lens capable of corresponding to a light-receiving element having more than ten million pixels can be achieved.

The third embodiment of the present invention is an embodiment as an imaging device such as a digital camera.

Namely, the imaging device according to the third embodiment of the present invention is constituted by using the above zoom lens as an optical system for shooting. With this constitution, a compact and high-performance imaging device such as a digital camera can be obtained.

A zoom lens according to the fourth embodiment of the present invention includes, in order from an object side to an image side along an optical axis, a first lens group having a positive refractive power, a second lens group having a negative refractive power, a third lens group having a negative refractive power, a fourth lens group having a positive refractive power, and a fifth lens group having a positive refractive power. In the zoom lens, all of the lens groups are moved such that, in the case of changing a magnification from the wide-angle end to the telephoto end, the interval between the first and second lens group is increased, the interval between the second and third lens groups is increased, the interval between the third and fourth lens groups is decreased, and the interval between the fourth and fifth lens groups is decreased. The focusing is performed by the displacement of the third lens group, and an entire optical length at the telephoto end Lt, a maximum distortion at the wide-angle end Disw, an image height Y', a focal length of the entire system at the wide-angle end Fw, a focal length of the entire system at the telephoto end Ft, an intermediate focal length Fm $\{=\sqrt{(Fw \times Ft)}\}$, and a maximum effective diameter of a lens $\phi$ satisfy the following conditions (1), (2).

$$0.01 < |(Lt \times Disw)/(Y' \times Fm)| < 0.02 \tag{1}$$

$$0.001 < |(\phi \times Disw)/(Y' \times Fm)| < 0.01 \tag{2}$$

Example 1

Specific examples based on the above embodiments of the present invention will be described in details. The following Examples 1-7 are specific examples in accordance with the numerical examples of the zoom lenses according to the first, second and fourth embodiments of the present invention. FIGS. 1-4 are views describing the zoom lens in Example 1 according to the first, second and fourth embodiments of the present invention. FIGS. 5-8 are views describing the zoom lens in Example 2 according to the first, second and fourth embodiments of the present invention. FIGS. 9-12 are views describing the zoom lens in Example 3 according to the first, second and fourth embodiments of the present invention. FIGS. 13-16 are views describing the zoom lens in Example 4 according to the first, second and fourth embodiments of the present invention. FIGS. 17-20 are views describing the zoom lens in Example 5 according to the first, second and fourth embodiments of the present invention. FIGS. 21-24 are views describing the zoom lens in Example 6 according to the first, second and fourth embodiments of the present invention. FIGS. 25-28 are views describing the zoom lens in Example 7 according to the first, second and fourth embodiments of the present invention.

In the zoom lens of each of Examples 1-7, the optical element made of the parallel plates disposed on the image plane side of the fifth lens group is illustrated as transparent parallel plates which are equivalent to various optical filters such as an optical low pass filter or infrared cut filter, or a cover glass (seal glass) of a light-receiving imaging element such as a COMS (complementary metal oxide semiconductor) image sensor or CCD (charged-coupled device) image sensor, and is referred to as FG such as a filter.

In Examples 1-7, an aspheric surface is used for several lens surfaces. In order to form an aspheric surface, a constitution which directly provides an aspheric surface on each lens surface such as a so-called mold aspheric surface lens or a constitution which obtains an aspheric surface by providing a resin thin film forming an aspheric surface on a lens surface of a spherical lens such as a so-called hybrid aspheric surface can be used.

The aberration in the zoom lens in each of Examples 1-7 is well corrected. The zoom lens in each of Examples 1-7 corresponds to a light-receiving element having more than ten million pixels. It is apparent from each of Examples 1-7 that the AF operation speed can be increased and a driving system required for the AF operation can be downsized, and also a preferable imaging performance can be obtained while achieving sufficient downsizing by constituting the zoom lens in accordance with the first, second and fourth embodiments of the present invention.

The meanings of marks common to Examples 1-7 are as follows.

f: focal length of entire optical system
F: F-number (F value)
ω: half-field angle (deg)
R: curvature radius (paraxial curvature radius in aspheric surface)
D: surface interval
Nd: refractive index
vd: Abbe's number
K: conical constant of aspheric surface
$A_4$: fourth order aspheric surface coefficient
$A_6$: sixth order aspheric surface coefficient
$A_8$: eighth order aspheric surface coefficient
$A_{10}$: tenth order aspheric surface coefficient
$A_{12}$: twelfth order aspheric surface coefficient
Bf: back-focusing (distance between the last optical surface of the optical system and the image plane)

An aspheric surface shape is defined by the following equation (1) where an inverse of a paraxial curvature radius (paraxial curvature) is C, a height from the optical axis is H, and a constant of the cone is k by using the aspheric surface coefficient of each order with the aspheric surface amount in the optical axis direction as X, and the aspheric surface shape is specified by giving the paraxial curvature radius, the conical constant and the aspheric surface coefficients.

$$X = \frac{cH^2}{1 + \sqrt{1 - (K+1)c^2 H^2}} + A_4 \cdot H^4 + A_6 \cdot H^6 + A_8 \cdot H^8 + A_{10} \cdot H^{10} + A_{12} \cdot H^{12} \qquad [\text{Equation 1}]$$

FIG. 1 is a view schematically illustrating the lens constitution of the optical system of the zoom lens in Example 1 according to the first, second, and fourth embodiments of the present invention, and the zooming trajectory from the wide-angle end to the telephoto end through a predetermined intermediate focal length. In FIG. 1, the upper view is a sectional view illustrating the constitution of the zoom lens at the short focal end, namely, the wide-angle end, and the middle view is a sectional view illustrating the constitution of the zoom lens at a predetermined intermediate focal length and the lower view is a sectional view illustrating the constitution of the zoom lens at a long focal end, namely, the telephoto end. In FIG. 1 illustrating the lens group arrangement of Example 1, the left side is an object (subject) side.

The zoom lens illustrated in FIG. 1 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 1 includes surface numbers R1-R25 of the respective optical surfaces. Each reference number in FIG. 1 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the image side, which is stronger than that on the object side, and the fifth lens L5 made of a biconvex lens having a convex surface on the object side, which is stronger than that on the image side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side. The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is slightly stronger than that on the image side, and the eleventh lens L11 made of a negative meniscus lens having a convex surface on the object side.

In this case, as illustrated in FIG. 1, in the case of changing a magnification from the wide-angle end (short focal end) to the telephoto end (long focal end), all of the lens groups are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4. The first lens group G1 monotonically moves from the image side to the object side.

In Example 1, the focal length of the entire optical system f, F-number F and half-field angle ω change in accordance with the zooming in the ranges of f=16.146-29.487-53.852, F=3.59-4.69-5.93 and ω=42.8-25.7-14.5. The optical properties of each optical element are as shown in the following Table 1.

TABLE 1

| OPTICAL PROPERTY | | | | | | |
|---|---|---|---|---|---|---|
| SURFACE NUMBER | CURVATURE RADIUS R | SURFACE INTERVAL D | Nd | vd | REMARK | |
| 1 | 35.22784 | 1.30000 | 1.84666 | 23.7800 | L1 | G1 |
| 2 | 25.43981 | 5.58108 | 1.69630 | 55.5300 | L2 | |
| 3 | 161.95730 | VARIABLE DA | | | | |
| 4 | 66.68463 | 0.97007 | 2.00100 | 29.1300 | L3 | G2 |
| 5 | 10.93000 | 6.31830 | | | | |
| 6* | −29.18377 | 0.80000 | 1.69350 | 53.1800 | L4 | |
| 7* | 26.19043 | 0.09955 | | | | |
| 8 | 25.80601 | 4.24896 | 1.84666 | 23.7800 | L5 | |
| 9 | −27.63060 | VARIABLE DB | | | | |
| 10 | −20.24167 | 0.80000 | 1.60300 | 65.4400 | L6 | G3 |
| 11 | −50.23484 | VARIABLE DC | | | | |
| 12 | APERTURE STOP(∞) | 1.45001 | | | | AD |
| 13* | 15.31467 | 3.43574 | 1.51633 | 64.0600 | L7 | G4 |
| 14* | −38.17926 | 0.10000 | | | | |
| 15 | 21.44923 | 3.93180 | 1.53172 | 48.8400 | L8 | |
| 16 | −17.87906 | 1.45000 | 1.83400 | 37.1600 | L9 | |
| 17 | 19.58694 | VARIABLE DD | | | | |
| 18* | 19.29863 | 4.94809 | 1.58913 | 61.1500 | L10 | G5 |
| 19* | −19.58674 | 0.23493 | | | | |
| 20 | 48.01352 | 0.80173 | 1.90366 | 31.3200 | L11 | |
| 21 | 16.49362 | VARIABLE DE | | | | |
| 22 | ∞ | 0.70000 | 1.53770 | 66.6000 | FG | |
| 23 | ∞ | 1.50000 | | | | |
| 24 | ∞ | 0.70000 | 1.50000 | 64.0000 | | |
| 25 | ∞ | Bf(VARIABLE) | | | | |

In Table 1, the lens surface having a surface number with * (asterisk) is an aspheric surface. This is the same as in other examples.

Namely, in Table 1, each of the sixth, seventh, thirteenth, fourteenth, eighteenth and nineteenth surfaces with * is an aspheric surface. The parameters (aspheric surface coefficient) of each aspheric surface in Equation 1 are as follows. In addition, in the aspheric surface parameters, En denotes ×10$^n$, and for example, E-05 denotes ×10$^{-5}$. These are the same as in other examples.

Aspheric Surface Parameter
Sixth Surface
K=0
$A_4$=−1.12571E-05
$A_6$=1.21899E-07
$A_8$=2.76874E-09

$A_{10}=-4.5160E-11$
$A_{12}1.38009E-13$
Seventh Surface
K=0
$A_4=-4.98762E-05$
$A_6=3.02710E-07$
$A_8=-1.83352E-09$
$A_{10}=-4.9553E-12$
Thirteenth Surface
K=0
$A_4=-2.23034E-05$
$A_6=-3.30061E-08$
$A_8=1.96596E-09$
$A_{10}=-4.33079E-11$
Fourteenth Surface
K=0
$A_4=-6.86789E-06$
$A_6=1.59127E-07$
$A_8=-8.05125E-10$
$A_{10}=-2.46291E-11$
Eighteenth Surface
K=-4.76959
$A_4=-2.06414E-06$
$A_6=-1.71695E-07$
$A_8=-2.33143E-09$
$A_{10}=6.08643E-12$
Nineteenth Surface
K=0.25043
$A_4=3.72591E-05$
$A_6=-4.11291E-08$
$A_8=-2.02648E-09$
$A_{10}=3.86766E-12$ In Example 1, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 2 in the zooming.

TABLE 2

VARIABLE INTERVAL

|  | WIDE-ANGLE END | INTERMEDIATE FOCAL LENGTH | TELE-PHOTO END |
|---|---|---|---|
| FOCAL LENGTH f | 16.146 | 29.487 | 53.852 |
| VARIABLE DA | 0.43999 | 6.06511 | 16.38637 |
| VARIABLE DB | 2.90306 | 3.44128 | 4.32097 |
| VARIABLE DC | 17.67216 | 7.91475 | 2.59996 |
| VARIABLE DD | 5.29575 | 2.75180 | 1.65000 |
| VARIABLE DE | 24.97241 | 38.15249 | 51.96423 |
| Bf | 3.05635 | 3.05579 | 3.05479 |

The values in the conditions (1), (2) are as follows.
Lt=119.35
ϕ=32.8
Disw=-4.2%
Y'=14.3
Fw=16.146
Ft=53.852
Fm: $\sqrt{(Fw \times Ft)}$=29.487

In this case, the values in the condition (3) are as follows.
Twt=25.637
Fw=16.146
Ft=53.852
Fm=$\sqrt{(Fw \times Ft)}$=29.487

Figure 2:
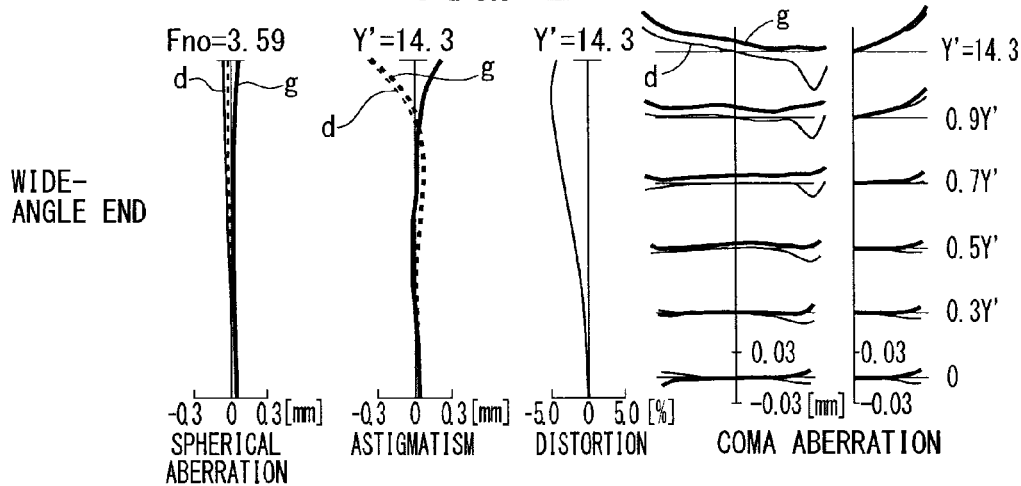
FIG. 2 is an aberration curve view at the wide-angle end of the zoom lens in Example 1.
Figure 3:
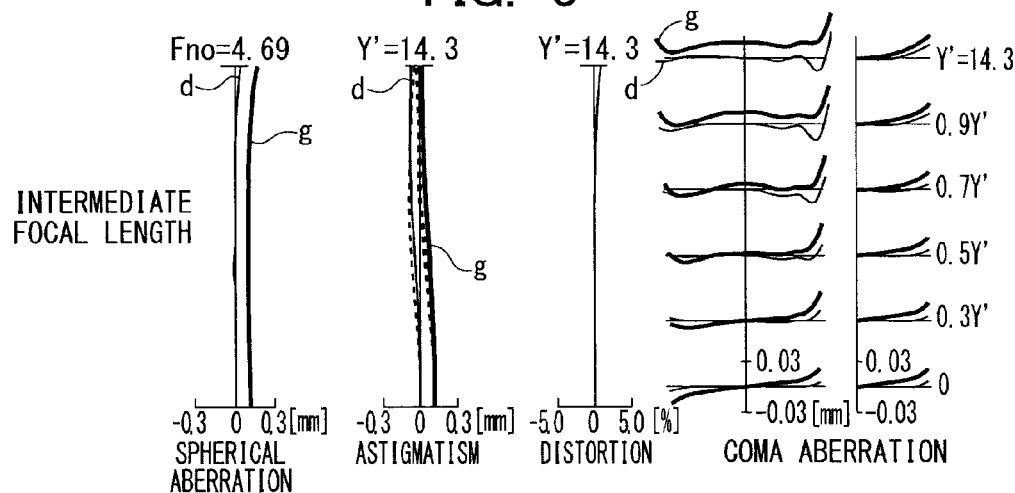
FIG. 3 is an aberration curve view at the intermediate focal length of the zoom lens in Example 1.
Figure 4:
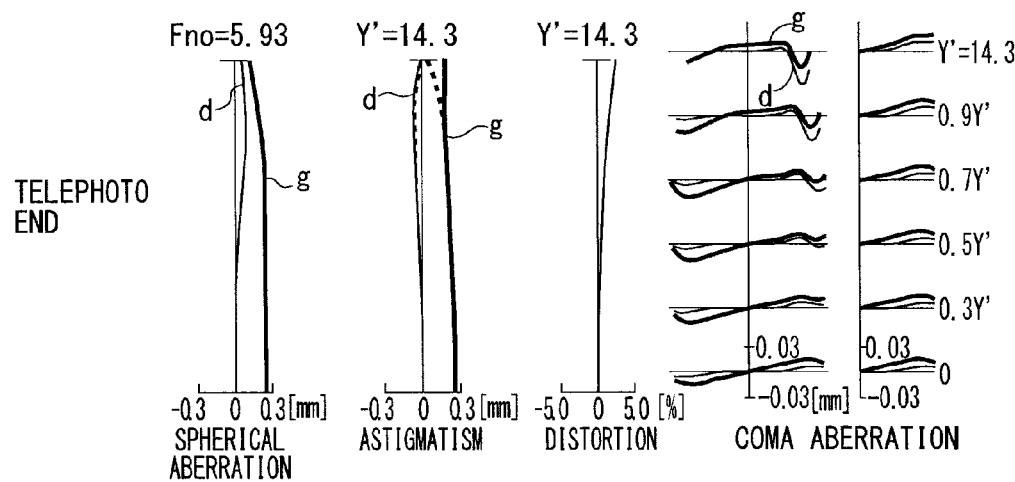
FIG. 4 is an aberration curve view at the telephoto end of the zoom lens in Example 1.

FIGS. 2, 3, 4 provide aberration views of spherical aberration, astigmatism, distortion and coma aberration at the wide-angle end, intermediate focal length and telephoto end in Example 1. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 2

FIG. 5 is a view schematically illustrating the lens constitution of the optical system of the zoom lens in Example 2 according to the first, second and fourth embodiments of the present invention, and the zooming trajectory from the wide-angle end to the telephoto end through a predetermined intermediate focal length. In FIG. 5, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 5 illustrating the lens group arrangement of Example 2, the left side is an object (subject) side.

The zoom lens illustrated in FIG. 5 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 5 includes surface numbers R1-R25 of the respective optical surfaces. Each reference number in FIG. 5 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the object side, which is stronger than that on the image side, and the fifth lens L5 made of a biconvex lens having a convex surface on the image side, which is stronger than that on the object side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side.

The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 5, in the case of changing a magnification from the wide-angle end (short focal end) to the telephoto end (long focal end), the first lens group G1 monotonically moves from the image side to the object side.

In Example 2, the focal length of the entire optical system f, F-number F and half-field angle ω change in accordance with the zooming in the ranges of f=16.146-29.486-53.851, F=3.6-4.62-5.77 and ω=42.9-25.6-14.5. The optical properties of each optical element in Example 2 are as shown in the following Table 3.

TABLE 3

| OPTICAL PROPERTY | | | | | |
|---|---|---|---|---|---|
| SURFACE NUMBER | CURVATURE RADIUS R | SURFACE INTERVAL D | Nd | vd | REMARK |
| 1 | 43.11718 | 1.29999 | 1.84666 | 23.78 | L1   G1 |
| 2 | 31.73933 | 5.57706 | 1.69680 | 55.53 | L2 |
| 3 | 190.09719 | VARIABLE DA | | | |
| 4 | 55.24695 | 0.97008 | 2.00100 | 29.13 | L3   G2 |
| 5 | 10.53158 | 7.00758 | | | |
| 6* | −37.69153 | 0.80000 | 1.69350 | 53.18 | L4 |
| 7* | 39.79764 | 0.12000 | | | |
| 8 | 35.75261 | 4.22772 | 1.84666 | 23.78 | L5 |
| 9 | −27.02142 | VARIABLE DB | | | |
| 10 | −22.16816 | 0.80000 | 1.60300 | 65.44 | L6   G3 |
| 11 | −68.86241 | VARIABLE DC | | | |
| 12 | APERTURE STOP(∞) | 1.45020 | | | AD |
| 13* | 17.70983 | 4.99510 | 1.51633 | 64.06 | L7   G4 |
| 14* | −25.76032 | 0.10000 | | | |
| 15 | 24.82196 | 3.73181 | 1.53172 | 48.84 | L8 |
| 16 | −18.83887 | 1.44999 | 1.83400 | 37.16 | L9 |
| 17 | 19.93203 | VARIABLE DD | | | |
| 18* | 18.95445 | 5.30000 | 1.58913 | 61.15 | L10  G5 |
| 19* | −22.79198 | 0.10000 | | | |
| 20 | 46.10650 | 0.80000 | 1.90366 | 31.32 | L11 |
| 21 | 16.80062 | VARIABLE DE | | | |
| 22 | ∞ | 0.70000 | 1.53770 | 66.60 | FG |
| 23 | ∞ | 1.50000 | | | |
| 24 | ∞ | 0.70000 | 1.50000 | 64.00 | |
| 25 | ∞ | Bf(VARIABLE) | | | |

In Table 3, the lens surface having a surface number with * (asterisk) is an aspheric surface. This is the same as in other examples.

Namely, in Table 3, each of the sixth, seventh, thirteenth, fourteenth, eighteenth and nineteenth surfaces with * is an aspheric surface. The parameters (aspheric surface coefficient) of each aspheric surface in Equation 1 are as follows.

Aspheric Surface Parameter
Sixth Surface
$K=0$
$A_4=-6.13912E-05$
$A_6=6.02764E-07$
$A_8=-3.68927E-09$
$A_{10}=-5.86282E-12$
Seventh Surface
$K=0$
$A_4=-9.55771E-05$
$A_6=6.67024E-07$
$A_8=-5.78157E-09$
$A_{10}=3.44512E-12$
Thirteenth Surface
$K=0$
$A_4=-2.21195E-05$
$A_6=-1.07672E-06$
$A_8=1.98544E-08$
$A_{10}=-3.47093E-10$ Fourteenth Surface
K=0
$A_4$=5.12674E-06
$A_6$=−9.94310E-07
$A_8$=1.53589E-08
$A_{10}$=−2.78900E-10
Eighteenth Surface
K=−1.2879
$A_4$=−1.57778E-05
$A_6$=−7.80973E-08
$A_8$=−8.69905E-10
$A_{10}$=3.89552E-12
Nineteenth Surface
K=0.98584
$A_4$=4.43195E-05
$A_6$=5.66872E-08
$A_8$=−2.64609E-09
$A_{10}$=1.33387E-11

In Example 2, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 4 in the zooming.

TABLE 4

VARIABLE INTERVAL

|  | WIDE-ANGLE END | INTERMEDIATE FOCAL LENGTH | TELE-PHOTO END |
| --- | --- | --- | --- |
| FOCAL LENGTH f | 16.146 | 29.486 | 53.851 |
| VARIABLE DA | 0.44012 | 8.55784 | 22.14102 |
| VARIABLE DB | 3.74070 | 3.93725 | 4.34529 |
| VARIABLE DC | 18.45697 | 8.08099 | 2.59987 |
| VARIABLE DD | 5.92655 | 3.05743 | 1.65001 |
| VARIABLE DE | 23.75626 | 36.70527 | 49.99053 |
| Bf | 5.04359 | 5.04306 | 5.04213 |

The values in the conditions (1), (2) are as follows.
Lt=127.4
φ=36.6
Disw=−4.58%
Y'=14.3
Fw=16.146
Ft=53.851
Fm: √(Fw×Ft)=29.486
In this case, the values in the condition (3) are as follows.
Twm=8.018
Twt=28.405
Fw=16.146
Ft=53.851
Fm=√(Fw×Ft)=29.486

FIGS. 6, 7, 8 provide aberration views of spherical aberration, astigmatism, distortion and coma aberration at the wide-angle end, intermediate focal length and telephoto end in Example 2. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 3

Figure 9:
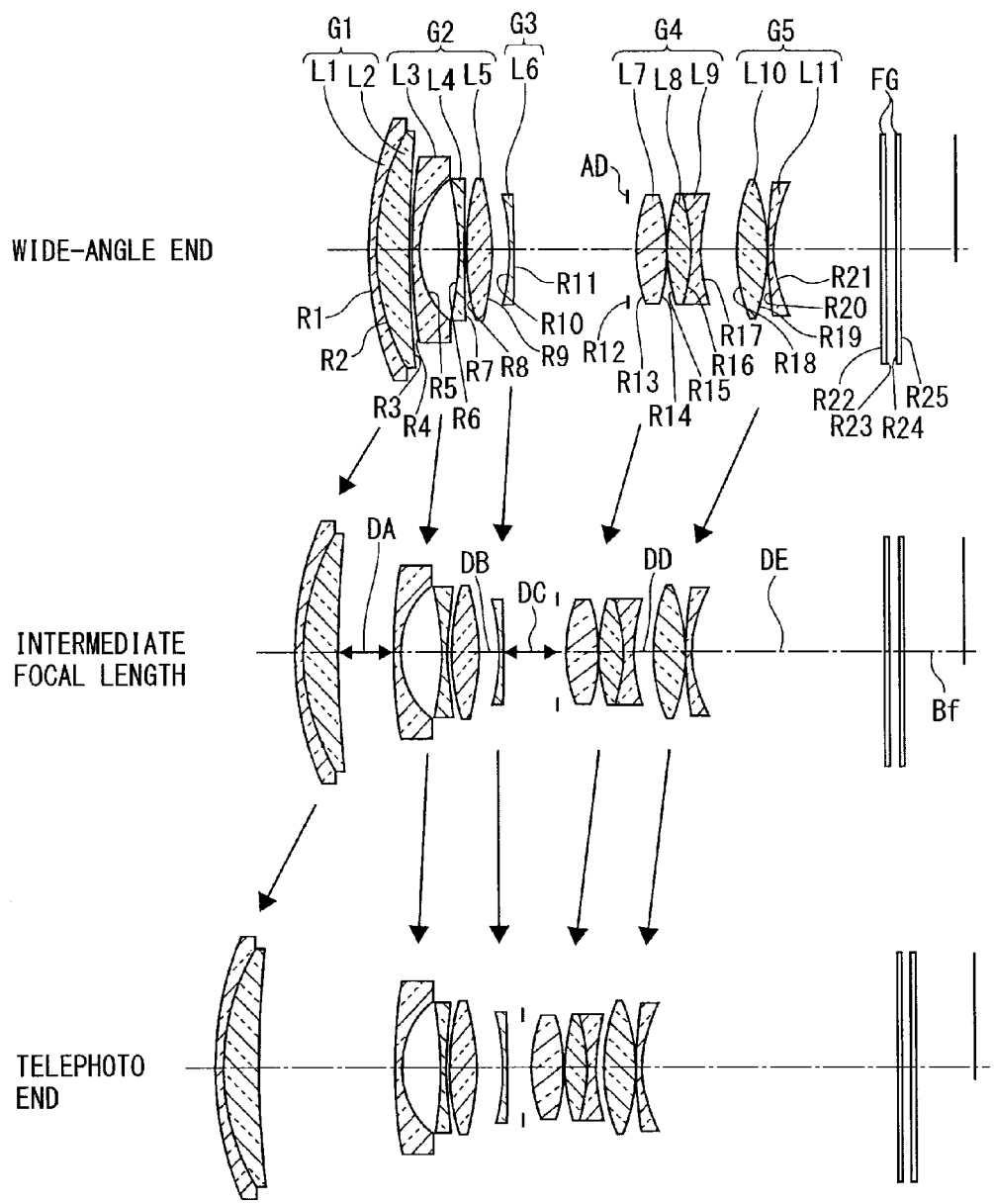
FIG. 9 is a sectional view illustrating the constitution of a zoom lens in Example 3 according to the first, second and fourth embodiments of the present invention.

FIG. 9 is a view schematically illustrating the lens constitution of the optical system of the zoom lens in Example 3 according to the first, second and fourth embodiments of the present invention, and the zooming trajectory from the wide-angle end to the telephoto end through a predetermined intermediate focal length. In FIG. 9, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 9 illustrating the lens group arrangement of Example 3, the left side is an object (subject) side.

The zoom lens illustrated in FIG. 9 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 9 includes surface numbers R1-R25 of the respective optical surfaces. Each reference number in FIG. 9 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the image side, which is stronger than that on the object side, and the fifth lens L5 made of a biconvex lens having a convex surface on the image side, which is stronger than that on the object side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the image side, which is stronger than that on the object side.

The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 9, in the case of changing a magnification from the wide-angle end (short focal end) to the telephoto end (long focal end), the first lens group G1 monotonically moves from the image side to the object side.

In Example 3, the focal length of the entire optical system f, F-number F and half-field angle ω change in accordance with the zooming in the ranges of f=16.146-29.487-53.85, F=3.62-4.59-5.67 and ω=42.8-25.6-14.5. The optical properties of each optical element in Example 3 are as shown in the following Table 5.

In Table 5, the lens surface having a surface number with * (asterisk) is an aspheric surface. This is the same as in other examples.

Namely, in Table 5, each of the sixth, seventh, thirteenth, fourteenth, eighteenth and nineteenth surfaces with * is an aspheric surface. The parameters (aspheric surface coefficient) of each aspheric surface in Equation 1 are as follows.

Aspheric Surface Parameter
Sixth Surface
$K=0$
$A_4=-8.18151E-06$
$A_6=-2.01833E-07$
$A_8=2.53333E-09$
$A_{10}=-1.29107E-11$
Seventh Surface
$K=0$
$A_4=-3.23283E-05$
$A_6=-1.88341E-07$
$A_8=1.96755E-09$
$A_{10}=-1.43273E-11$
Thirteenth Surface
$K=0$
$A_4=-3.22004E-05$
$A_6=-9.60992E-07$
$A_8=1.55589E-08$
$A_{10}=-2.82657E-10$
Fourteenth Surface
$K=0$
$A_4=3.53815E-06$
$A_6=-8.66214E-07$
$A_8=1.17377E-08$
$A_{10}=-2.24402E-10$
Eighteenth Surface
$K=-1.27337$
$A_4=-1.58768E-05$
$A_6=-1.86624E-07$
$A_8=6.94712E-10$
$A_{10}=-5.97184E-12$

TABLE 5

OPTICAL PROPERTY

| SURFACE NUMBER | CURVATURE RADIUS R | SURFACE INTERVAL D | Nd | vd | | REMARK |
|---|---|---|---|---|---|---|
| 1 | 44.83622 | 1.30000 | 1.84666 | 23.78 | L1 | G1 |
| 2 | 30.32788 | 5.80250 | 1.77250 | 49.60 | L2 | |
| 3 | 152.20233 | VARIABLE DA | | | | |
| 4 | 55.56877 | 0.97009 | 2.00100 | 29.13 | L3 | G2 |
| 5 | 10.85110 | 6.67902 | | | | |
| 6* | −40.92454 | 0.80000 | 1.77030 | 47.4 | L4 | |
| 7* | 36.32245 | 0.65885 | | | | |
| 8 | 30.89732 | 4.44422 | 1.84666 | 23.78 | L5 | |
| 9 | −26.99833 | VARIABLE DB | | | | |
| 10 | −24.45877 | 0.80000 | 1.64850 | 53.02 | L6 | G3 |
| 11 | −103.58339 | VARIABLE DC | | | | |
| 12 | APERTURE STOP(∞) | 1.45008 | | | | AD |
| 13* | 16.52481 | 5.35383 | 1.51633 | 64.06 | L7 | G4 |
| 14* | −25.99633 | 0.10000 | | | | |
| 15 | 23.78029 | 3.61747 | 1.51742 | 52.43 | L8 | |
| 16 | −22.01894 | 1.45000 | 1.83400 | 37.16 | L9 | |
| 17 | 17.55937 | VARIABLE DD | | | | |
| 18* | 19.88520 | 5.30000 | 1.58913 | 61.15 | L10 | G5 |
| 19* | −22.74438 | 0.10000 | | | | |
| 20 | 53.58387 | 0.80000 | 1.90366 | 31.32 | L11 | |
| 21 | 18.67841 | VARIABLE DE | | | | |
| 22 | ∞ | 0.70000 | 1.53770 | 66.60 | | FG |
| 23 | ∞ | 1.50000 | | | | |
| 24 | ∞ | 0.70000 | 1.50000 | 64.00 | | |
| 25 | ∞ | Bf(VARIABLE) | | | | |

Nineteenth Surface
K=0
$A_4$=3.31640E-05
$A_6$=−1.06067E-07
$A_8$=−6.29723E-10
$A_{10}$=0

In Example 3, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 6 in the zooming.

TABLE 6

VARIABLE INTERVAL

|  | WIDE-ANGLE END | INTERMEDIATE FOCAL LENGTH | TELE-PHOTO END |
| --- | --- | --- | --- |
| FOCAL LENGTH f | 16.146 | 29.487 | 53.85 |
| VARIABLE DA | 0.44000 | 8.87257 | 22.67111 |
| VARIABLE DB | 2.87666 | 3.12901 | 4.33617 |
| VARIABLE DC | 19.29016 | 8.43762 | 2.59994 |
| VARIABLE DD | 6.18178 | 3.32394 | 1.65001 |
| VARIABLE DE | 18.11816 | 30.39738 | 42.55296 |
| Bf | 9.76405 | 9.76371 | 9.76319 |

The values in the conditions (1), (2) are as follows.
Lt=126.1
φ=37
Disw=−4.39%
Y'=14.3
Fw=16.146
Ft=53.85
Fm: $\sqrt{(Fw \times Ft)}$=29.487
In this case, the values in the condition (3) are as follows.
Twm=7.254
Twt=26.903
Fw=16.146
Ft=53.85
Fm=$\sqrt{(Fw \times Ft)}$=29.487

Figure 10:
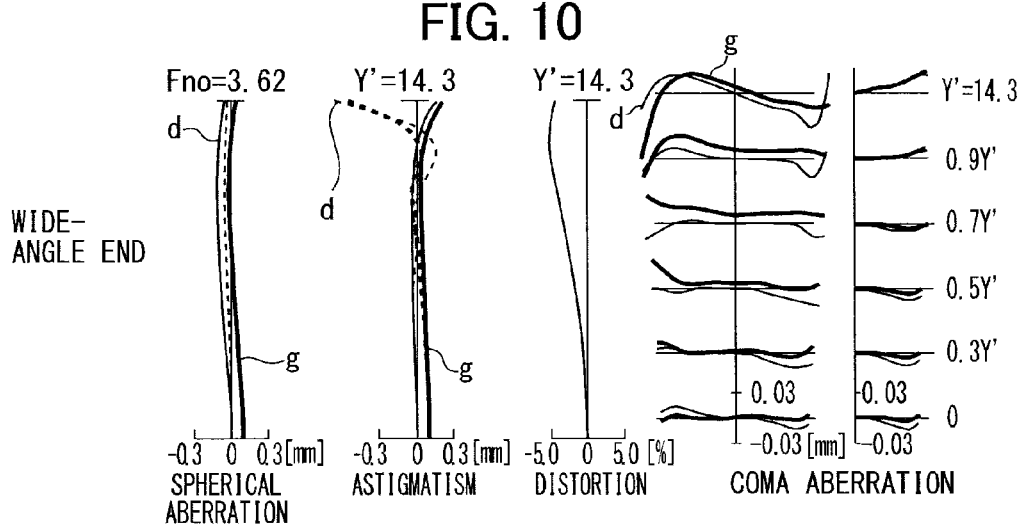
FIG. 10 is an aberration curve view at the wide-angle end of the zoom lens in Example 3.
Figure 11:
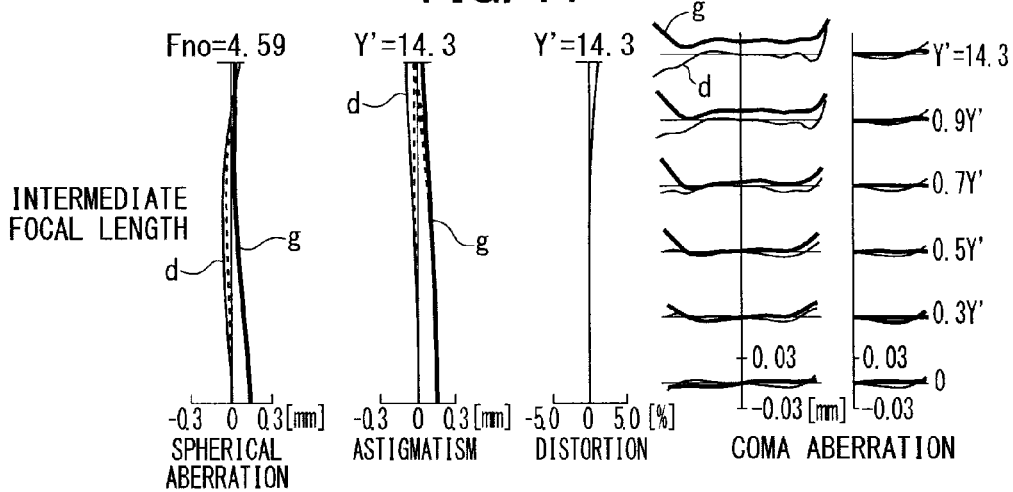
FIG. 11 is an aberration curve view at the intermediate focal length of the zoom lens in Example 3.
Figure 12:
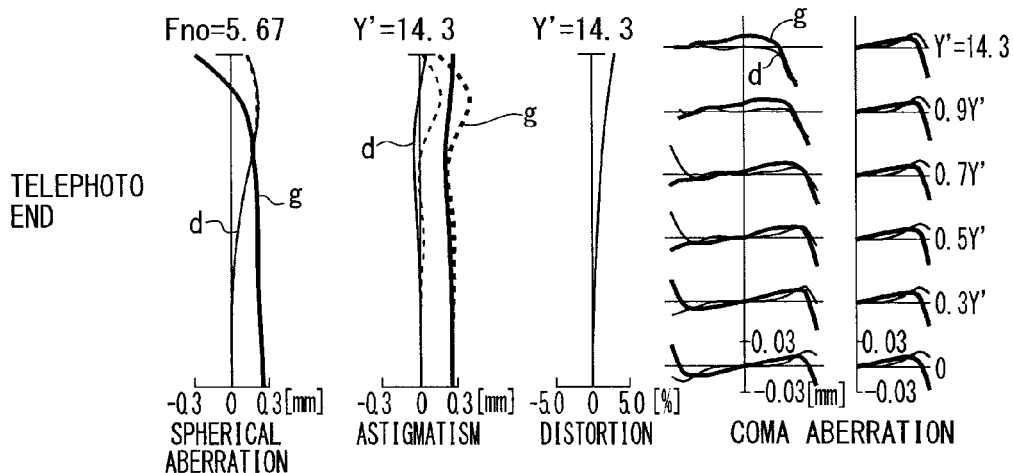
FIG. 12 is an aberration curve view at the telephoto end of the zoom lens in Example 3.

FIGS. 10, 11, 12 provide aberration views of spherical aberration, astigmatism, distortion and coma aberration at the wide-angle end, intermediate focal length and telephoto end in Example 3. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 4

Figure 13:
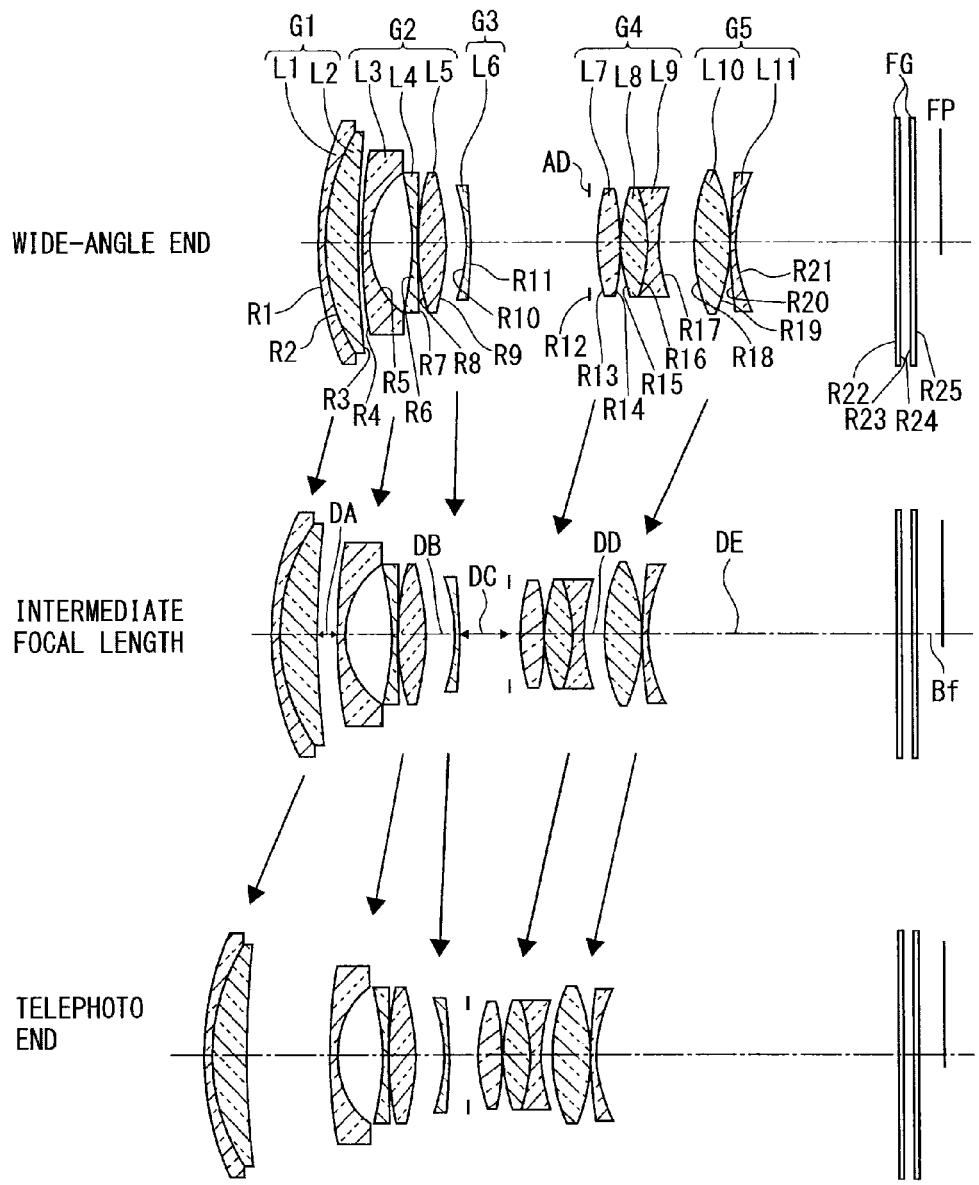
FIG. 13 is a sectional view illustrating the constitution of a zoom lens in Example 4 according to the first, second and fourth embodiments of the present invention.

FIG. 13 is a view schematically illustrating the lens constitution of the optical system of the zoom lens in Example 4 according to the first, second and fourth embodiments of the present invention, and the zooming trajectory along the zooming from the wide-angle end to the telephoto end through a predetermined intermediate focal length. In FIG. 13, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 13 illustrating the lens group arrangement of Example 4, the left side is an object (subject) side.

The zoom lens illustrated in FIG. 13 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 13 includes surface numbers R1-R25 of the respective optical surfaces. Each reference number in FIG. 13 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the object side, which is stronger than that on the image side, and the fifth lens L5 made of a biconvex lens having a convex surface on the image side, which is stronger than that on the object side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side. The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 13, in the case of changing a magnification from the wide-angle end (short focal end) to the telephoto end (long focal end), the first lens group G1 monotonically moves from the image side to the object side.

In Example 4, the focal length of the entire optical system f, F-number F and half-field angle ω change in accordance with the zooming in the ranges of f=16.195-27.22-45.75, F=3.63-4.95-5.86 and ω=42.7-27.8-16.9. The optical properties of each optical element in Example 4 are as shown in the following Table 7.

TABLE 7

OPTICAL PROPERTY

| SURFACE NUMBER | CURVATURE RADIUS R | SURFACE INTERVAL D | Nd | vd | REMARK | |
|---|---|---|---|---|---|---|
| 1 | 33.04630 | 1.30000 | 1.84666 | 23.78 | L1 | G1 |
| 2 | 24.61909 | 5.03061 | 1.69680 | 55.53 | L2 | |
| 3 | 136.08670 | VARIABLE DA | | | | |
| 4 | 66.82379 | 0.97000 | 2.00100 | 29.13 | L3 | G2 |
| 5 | 10.13620 | 6.58248 | | | | |
| 6* | −27.08140 | 0.80000 | 1.69350 | 53.18 | L4 | |
| 7* | 42.28382 | 0.10000 | | | | |
| 8 | 36.12687 | 4.06747 | 1.84666 | 23.78 | L5 | |
| 9 | −23.91703 | VARIABLE DB | | | | |
| 10 | −19.22723 | 0.80000 | 1.60300 | 65.44 | L6 | G3 |
| 11 | −40.79376 | VARIABLE DC | | | | |
| 12 | APERTURE STOP(∞) | 1.45000 | | | | AD |
| 13* | 15.53437 | 3.73586 | 1.51633 | 64.06 | L7 | G4 |
| 14* | −28.31772 | 0.10000 | | | | |
| 15 | 26.51545 | 3.96987 | 1.53172 | 48.84 | L8 | |
| 16 | −16.08335 | 1.45000 | 1.83400 | 37.16 | L9 | |
| 17 | 21.49926 | VARIABLE DD | | | | |
| 18* | 18.61811 | 5.28649 | 1.58913 | 61.15 | L10 | G5 |
| 19* | −19.32644 | 0.10000 | | | | |
| 20 | 50.34422 | 0.82401 | 1.90366 | 31.32 | L11 | |
| 21 | 15.67976 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf(VARIABLE) | | | | |

In Table 7, the lens surface having a surface number with * (asterisk) is an aspheric surface. This is the same as in other examples.

Namely, in Table 7, each of the sixth, seventh, thirteenth, fourteenth, eighteenth, and nineteenth surfaces with * is an aspheric surface. The parameters (aspheric surface coefficient) of each aspheric surface in Equation 1 are as follows.

Aspheric Surface Parameter
Sixth Surface
$K=0$
$A_4=-2.62797E-05$
$A_6=2.15039E-07$
$A_8=1.25881E-09$
$A_{10}=-3.37339E-11$
$A_{12}=-5.96466E-14$
Seventh Surface
$K=0$
$A_4=-6.94415E-05$
$A_6=2.98647E-07$
$A_8=-1.81245E-09$
$A_{10}=-2.26671E-11$
Thirteenth Surface
$K=0$
$A_4=-1.84404E-05$
$A_6=-9.86481E-08$
$A_8=1.21421E-09$
$A_{10}=-2.38227E-11$
Fourteenth Surface
$K=0$
$A_4=9.50545E-06$
$A_6=8.22895E-08$
$A_8=-9.41319E-10$
$A_{10}=-1.57178E-11$
$A_{12}=0$
Eighteenth Surface
$K=-4.00213$
$A_4=5.35275E-06$
$A_6=-6.14576E-08$
$A_8=-3.35757E-09$
$A_{10}=3.63892E-11$
Nineteenth Surface
$K=-0.0203$
$A_4=4.11207E-05$
$A_6=6.45731E-08$
$A_8=-4.12993E-09$
$A_{10}=4.1149E-11$ In Example 4, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 8 in the zooming.

TABLE 8

VARIABLE INTERVAL

|  | WIDE-ANGLE END | INTERMEDIATE FOCAL LENGTH | TELE-PHOTO END |
| --- | --- | --- | --- |
| FOCAL LENGTH f | 16.195 | 27.22 | 45.75 |
| VARIABLE DA | 0.44000 | 3.12474 | 13.64650 |
| VARIABLE DB | 2.92021 | 3.87145 | 4.13333 |
| VARIABLE DC | 16.99152 | 7.10888 | 2.60000 |
| VARIABLE DD | 5.50038 | 2.77435 | 1.65000 |
| VARIABLE DE | 23.57753 | 35.89483 | 45.19931 |
| Bf | 3.49801 | 3.49755 | 3.49694 |

The values in the conditions (1), (2) are as follows.
Lt=110.19
$\phi$=31
Disw=−4.3%
Y'=14.3
Fw=16.195
Ft=45.75
Fm: $\sqrt{(Fw \times Ft)}$=27.22
In this case, the values in the condition (3) are as follows.
Twm=3.345
Twt=17.799
Fw=16.195
Ft=45.75
Fm=$\sqrt{(Fw \times Ft)}$=27.22

Figure 14:
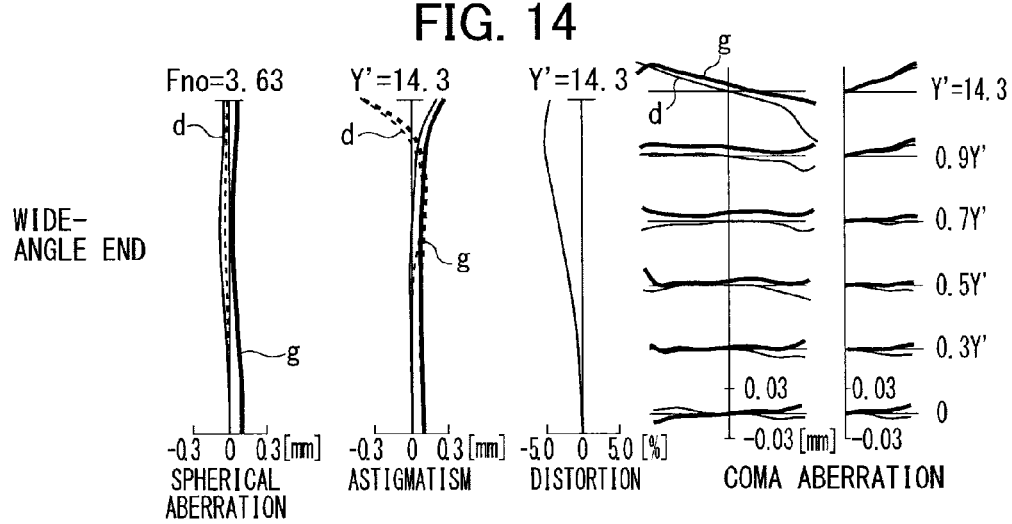
FIG. 14 is an aberration curve view at the wide-angle end of the zoom lens in Example 4.
Figure 15:
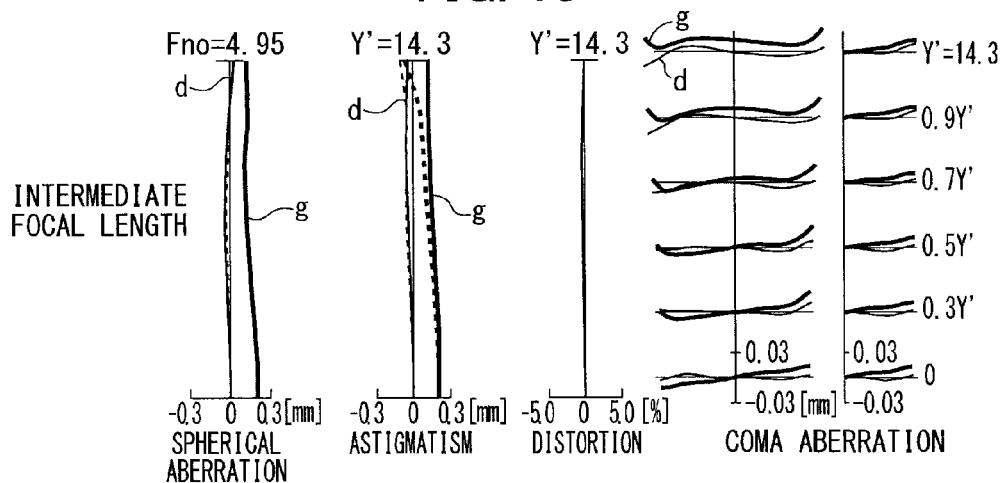
FIG. 15 is an aberration curve view at the intermediate focal length of the zoom lens in Example 4.
Figure 16:
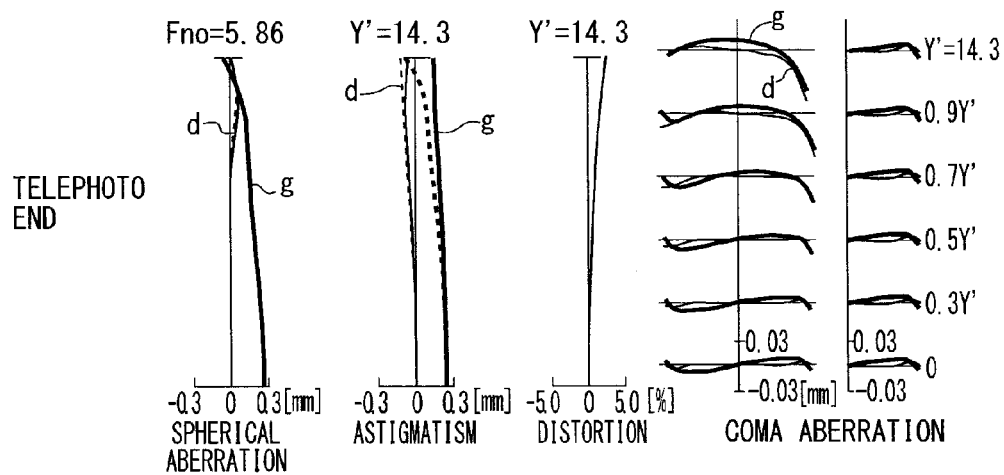
FIG. 16 is an aberration curve view at the telephoto end of the zoom lens in Example 4.

FIGS. 14, 15, 16 provide aberration views of spherical aberration, astigmatism, distortion and coma aberration at the wide-angle end, intermediate focal length and telephoto end in Example 4. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 5

Figure 17:
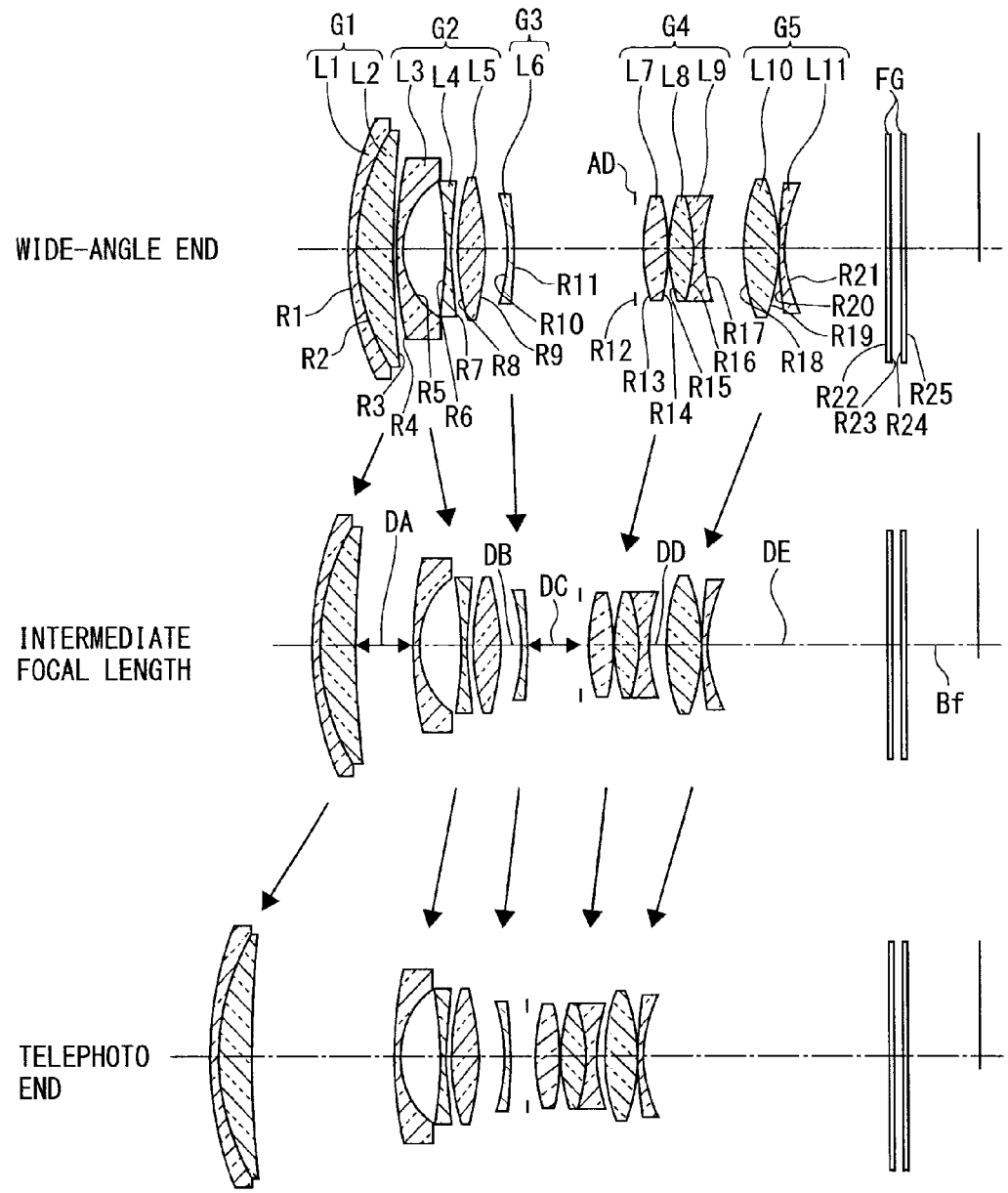
FIG. 17 is a sectional view illustrating the constitution of a zoom lens in Example 5 according to the first, second and fourth embodiments of the present invention.

FIG. 17 is a view schematically illustrating the lens constitution of the optical system of the zoom lens in Example 5 according to the first, second and fourth embodiments of the present invention, and the zooming trajectory from the wide-angle end to the telephoto end through a predetermined intermediate focal length. In FIG. 17, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 17 illustrating the lens group arrangement of Example 5, the left side is an object (subject) side.

The zoom lens illustrated in FIG. 17 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 17 includes surface numbers R1-R25 of the respective optical surfaces. Each reference number in FIG. 17 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased after being decreased once, the interval between the third and fourth lens groups G3, G4 is decreased, and the interval between the fourth and fifth lens groups G4, G5 is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the image side, which is stronger than that on the object side, and the fifth lens L5 made of a biconvex lens having a convex surface on the image side, which is stronger than that on the object side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the image side, which is stronger than that on the object side. The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 17, in the case of changing a magnification from the wide-angle end (short focal end) to the telephoto end (long focal end), the first lens group G1 monotonically moves from the image side to the object side.

In Example 5, the focal length of the entire optical system f, F-number F and half-field angle ω change in accordance with the zooming in the ranges of f=16.146-29.484-53.843, F=3.63-4.64-5.74 and ω=42.8-25.5-14.4. The optical properties of each optical element in Example 5 are as shown in the following Table 9.

TABLE 9

OPTICAL PROPERTY

| SURFACE NUMBER | CURVATURE RADIUS R | SURFACE INTERVAL D | Nd | vd | REMARK | |
|---|---|---|---|---|---|---|
| 1 | 46.03179 | 1.30005 | 1.84666 | 23.78 | L1 | G1 |
| 2 | 31.22940 | 5.51888 | 1.77250 | 49.60 | L2 | |
| 3 | 152.04501 | VARIABLE DA | | | | |
| 4 | 51.07120 | 0.97002 | 2.00100 | 29.13 | L3 | G2 |
| 5 | 10.77721 | 6.63709 | | | | |
| 6* | −42.16678 | 0.79999 | 1.77030 | 47.40 | L4 | |
| 7* | 38.75553 | 0.96368 | | | | |
| 8 | 30.38725 | 4.33203 | 1.84666 | 23.78 | L5 | |
| 9 | −29.02408 | VARIABLE DB | | | | |
| 10 | −21.91807 | 0.80000 | 1.64850 | 53.02 | L6 | G3 |
| 11 | −79.56447 | VARIABLE DC | | | | |
| 12 | APERTURE STOP(∞) | 1.44994 | | | | AD |
| 13* | 18.62497 | 4.02774 | 1.51633 | 64.06 | L7 | G4 |
| 14* | −25.81393 | 0.09995 | | | | |
| 15 | 20.81187 | 4.01271 | 1.51742 | 52.43 | L8 | |
| 16 | −19.74213 | 1.44999 | 1.83400 | 37.16 | L9 | |
| 17 | 19.22015 | VARIABLE DD | | | | |
| 18* | 20.95766 | 5.30002 | 1.58913 | 61.15 | L10 | G5 |
| 19* | −22.01066 | 0.10001 | | | | |
| 20 | 42.36060 | 0.79999 | 1.90366 | 31.32 | L11 | |
| 21 | 16.44550 | VARIABLE DE | | | | |
| 22 | ∞ | 0.70000 | 1.53770 | 66.60 | | FG |
| 23 | ∞ | 1.50000 | | | | |
| 24 | ∞ | 0.70000 | 1.50000 | 64.00 | | |
| 25 | ∞ | Bf(VARIABLE) | | | | |

In Table 9, the lens surface having a surface number with * (asterisk) is an aspheric surface. This is the same as in other examples.

Namely, in Table 9, each of the sixth, seventh, thirteenth, fourteenth, eighteenth and nineteenth surfaces with * is an aspheric surface. The parameters (aspheric surface coefficient) of each aspheric surface in Equation 1 are as follows. In addition, in the aspheric surface parameters, En denotes $\times 10^n$, and for example, E-05 denotes $\times 10^{-5}$. These are the same as in other examples.

Aspheric Surface Parameter
Sixth Surface
$K=0$
$A_4=5.52979E-05$
$A_6=-1.46723E-06$
$A_8=1.40955E-08$
$A_{10}=-5.75258E-11$
Seventh Surface
$K=0$
$A_4=3.02092E-05$
$A_6=-1.53901E-06$
$A_8=1.44769E-08$
$A_{10}=-6.26901E-11$
Thirteenth Surface
$K=0$
$A_4=-8.40542E-06$
$A_6=-4.37152E-07$
$A_8=1.03740E-08$
$A_{10}=-2.45238E-10$
Fourteenth Surface
$K=0$
$A_4=2.47361E-05$
$A_6=-6.21729E-07$
$A_8=1.37690E-08$
$A_{10}=-2.72842E-10$
Eighteenth Surface
$K=0.92674$
$A_4=-1.83059E-05$
$A_6=-3.30349E-08$
$A_8=-2.28321E-09$
$A_{10}=-6.15846E-13$
Nineteenth Surface
$K=0$
$A_4=3.19375E-05$
$A_6=3.31577E-08$
$A_8=-2.88956E-09$
$A_{10}=0$ In Example 5, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as the following table 8 in the zooming.

TABLE 10

VARIABLE INTERVAL

|  | WIDE-ANGLE END | INTERMEDIATE FOCAL LENGTH | TELE-PHOTO END |
|---|---|---|---|
| FOCAL LENGTH f | 16.146 | 29.484 | 53.843 |
| VARIABLE DA | 0.47981 | 8.94913 | 23.54063 |
| VARIABLE DB | 3.46925 | 3.31521 | 4.34035 |
| VARIABLE DC | 18.75306 | 8.22939 | 2.59987 |
| VARIABLE DD | 6.13180 | 2.96958 | 1.64988 |
| VARIABLE DE | 27.35054 | 39.92413 | 52.30469 |
| Bf | 0.50000 | 0.50000 | 0.50000 |

The values in the conditions (1), (2) are as follows.
Lt=126.4
φ=36.7
Disw=−4.37%
Y'=14.3
Fw=16.146
Ft=53.843
Fm: √(Fw×Ft)=29.484
In this case, the values in the condition (3) are as follows.
Twm=7.203
Twt=28.251
Fw=16.146
Ft=53.843
Fm=√(Fw×Ft)=29.484

Figure 18:
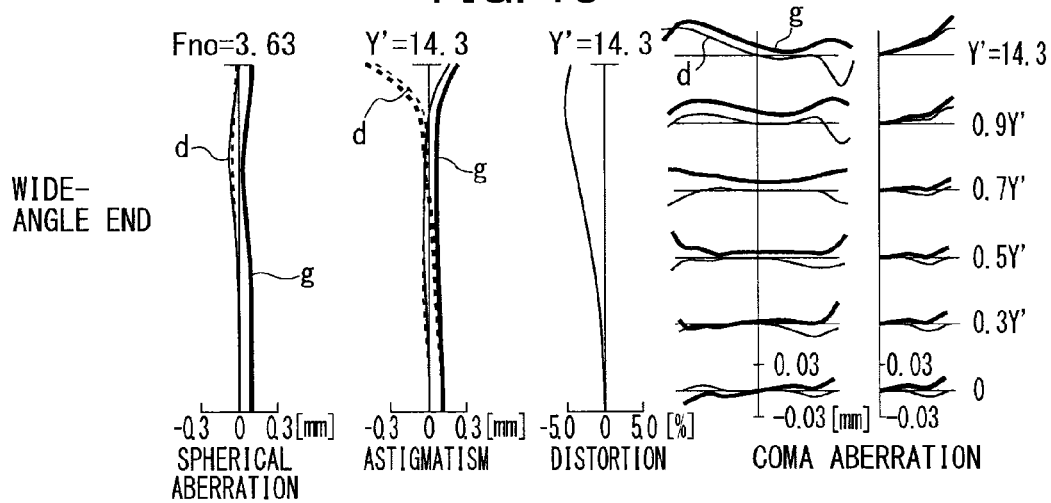
FIG. 18 is an aberration curve view at the wide-angle end of the zoom lens in Example 5.
Figure 19:
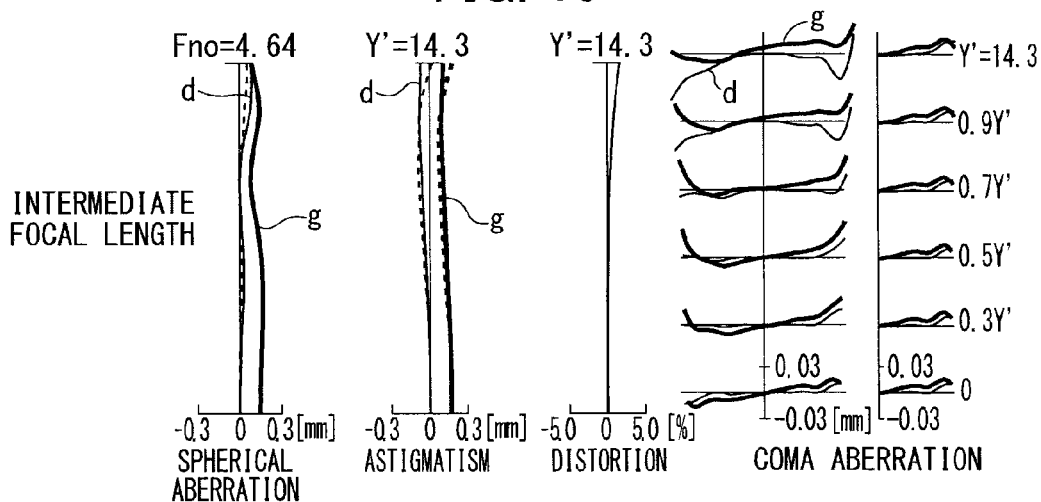
FIG. 19 is an aberration curve view at the intermediate focal length of the zoom lens in Example 5.
Figure 20:
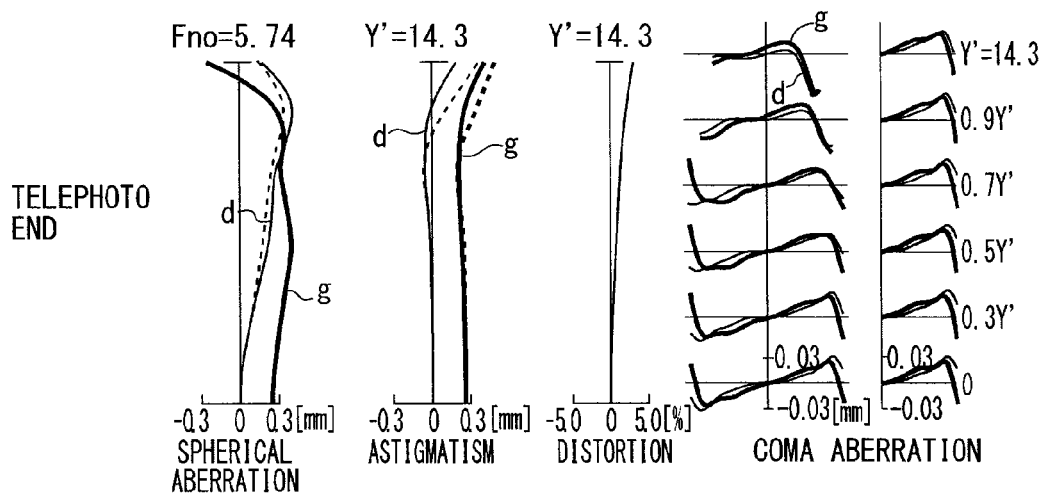
FIG. 20 is an aberration curve view at the telephoto end of the zoom lens in Example 5.

FIGS. 18, 19, 20 provide aberration views of spherical aberration, astigmatism, distortion and coma aberration at the wide-angle end, intermediate focal length and telephoto end in Example 5. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 6

Figure 21:
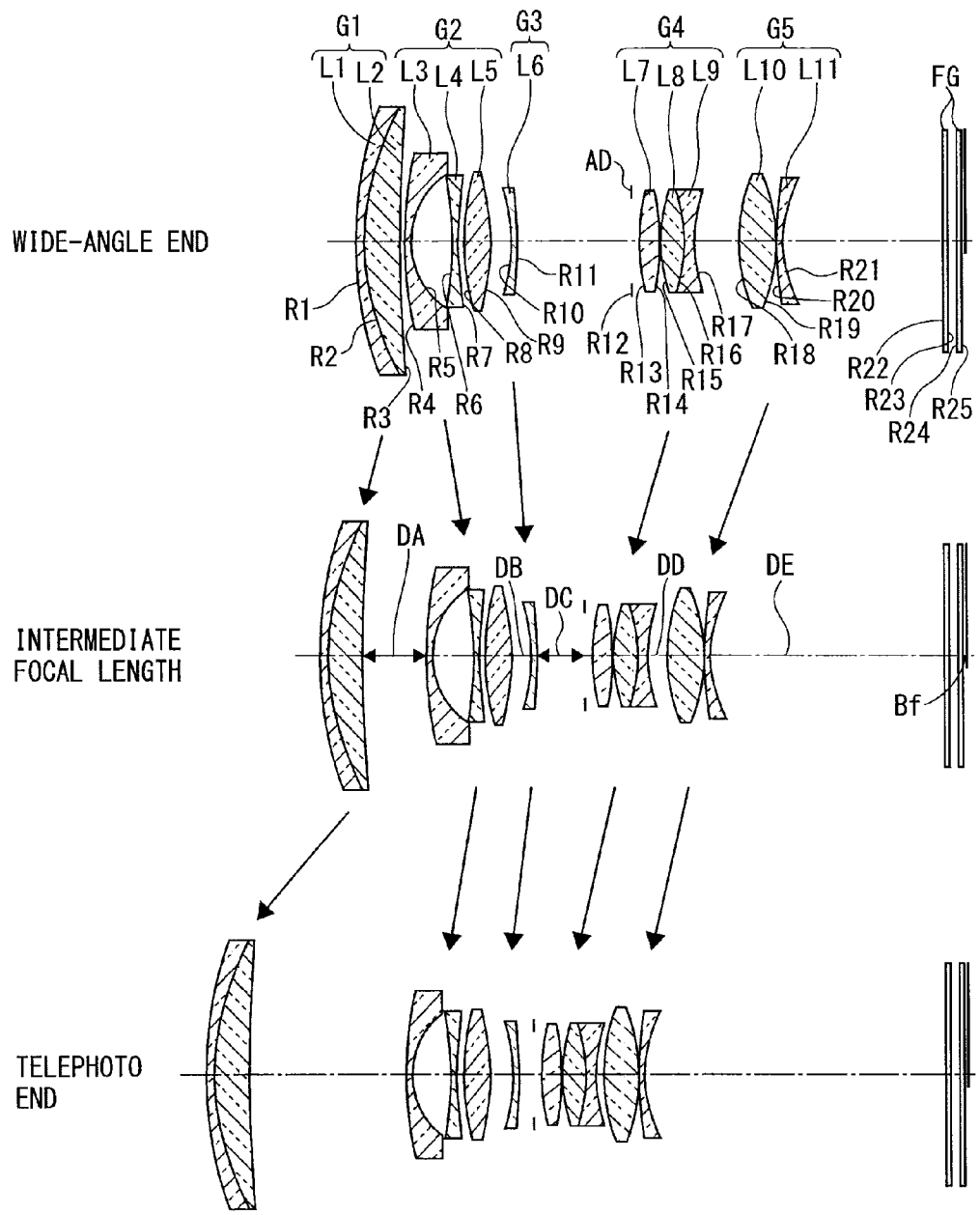
FIG. 21 is a sectional view illustrating the constitution of a zoom lens in Example 6 according to the first, second and fourth embodiments of the present invention.

FIG. 21 is a view schematically illustrating the lens constitution of the optical system of the zoom lens in Example 6 according to the first, second and fourth embodiments of the present invention, and the zooming trajectory from the wide-angle end to the telephoto end through a predetermined intermediate focal length. In FIG. 21, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 21 illustrating the lens group arrangement of Example 6, the left side is an object (subject) side.

The zoom lens illustrated in FIG. 21 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 21 includes surface numbers R1-R25 of the respective optical surfaces. Each reference number in FIG. 21 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased after being decreased once, the interval between the third and fourth lens groups G3, G4 is decreased, and the interval between the fourth and fifth lens groups G4, G5 is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the image side, which is stronger than that on the object side, and the fifth lens L5 made of a biconvex lens having a convex surface on the image side, which is slightly stronger than that on the object side.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having a convex surface on both surfaces, which is equal to each other, and the ninth lens L9 made of a biconcave lens having a concave surface on both surfaces, which is equal to each other. The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 21, in the case of changing a magnification from the wide-angle end (short focal end) to the telephoto end (long focal end), the first lens group G1 monotonically moves from the image side to the object side.

In Example 6, the focal length of the entire optical system f, F-number F and half-field angle ω change in accordance with the zooming in the ranges of f=16.146-29.486-53.852, F=3.62-4.62-5.77 and ω=42.9-25.4-14.4. The optical properties of each optical element in Example 6 are as shown in the following Table 11.

TABLE 11

OPTICAL PROPERTY

| SURFACE NUMBER | CURVATURE RADIUS R | SURFACE INTERVAL D | Nd | vd | REMARK | |
|---|---|---|---|---|---|---|
| 1 | 52.97005 | 1.31000 | 1.84666 | 23.78 | L1 | G1 |
| 2 | 35.71101 | 5.48584 | 1.77250 | 49.60 | L2 | |
| 3 | 189.65170 | VARIABLE DA | | | | |
| 4 | 57.34337 | 0.95497 | 2.00100 | 29.13 | L3 | G2 |
| 5 | 11.09490 | 6.36289 | | | | |
| 6* | −52.53144 | 0.80001 | 1.77030 | 47.40 | L4 | |
| 7* | 36.40322 | 1.16039 | | | | |
| 8 | 30.42534 | 4.23829 | 1.84666 | 23.78 | L5 | |
| 9 | −30.42507 | VARIABLE DB | | | | |
| 10 | −22.85191 | 0.80000 | 1.64850 | 53.02 | L6 | G3 |
| 11 | −92.38759 | VARIABLE DC | | | | |
| 12 | APERTURE STOP(∞) | 1.40001 | | | AD | |
| 13* | 19.49107 | 3.32058 | 1.51633 | 64.06 | L7 | G4 |
| 14* | −25.78639 | 0.11538 | | | | |
| 15 | 18.99577 | 4.01733 | 1.51742 | 52.43 | L8 | |
| 16 | −18.99577 | 1.40000 | 1.83400 | 37.16 | L9 | |
| 17 | 18.99577 | VARIABLE DD | | | | |
| 18* | 19.38104 | 5.59999 | 1.58913 | 61.15 | L10 | G5 |
| 19* | −23.21203 | 0.10000 | | | | |
| 20 | 34.69037 | 0.80000 | 1.90366 | 31.32 | L11 | |
| 21 | 14.67162 | VARIABLE DE | | | | |
| 22 | ∞ | 0.70000 | 1.53770 | 66.60 | | |
| 23 | ∞ | 1.50000 | | | | |
| 24 | ∞ | 0.70000 | 1.50000 | 64.00 | | |
| 25 | ∞ | Bf(VARIABLE) | | | | |

In Table 11, the lens surface having a surface number with * (asterisk) is an aspheric surface. This is the same as in other examples.

Namely, in Table 11, each of the sixth, seventh, thirteenth, fourteenth, eighteenth and nineteenth surfaces with * is an aspheric surface. The parameters (aspheric surface coefficient) of each aspheric surface in Equation 1 are as follows. In addition, in the aspheric surface parameters, En denotes ×10$^n$, for example, E-05 denotes ×10$^{-5}$. These are the same as in other examples.

Aspheric Surface Parameter
Sixth Surface
K=0
$A_4$=2.63554E-05
$A_6$=−1.09237E-06
$A_8$=9.8447E-09
$A_{10}$=−3.41409E-11
Seventh Surface
K=0
$A_4$=2.93738E-06
$A_6$=−1.13624E-06
$A_8$=1.01043E-08
$A_{10}$=−3.88306E-11
Thirteenth Surface
K=0
$A_4$=3.21402E-07
$A_6$=−1.03872E-07
$A_8$=6.34622E-09
$A_{10}$=−1.99948E-10
Fourteenth Surface 1K=0
$A_4$=2.47699E-05
$A_6$=−2.4115E-07
$A_8$=9.50458E-09
$A_{10}$=−2.36136E-10

Eighteenth Surface
K=−0.57855
$A_4$=−1.83484E-05
$A_6$=−2.90044E-08
$A_8$=−1.90061E-09
$A_{10}$=−5.50054E-12
Nineteenth Surface
K=−0.09961
$A_4$=3.54974E-05
$A_6$=3.43435E-08
$A_8$=−3.14805E-09

In Example 6, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 12 in the zooming.

TABLE 12

VARIABLE INTERVAL

| | WIDE-ANGLE END | INTERMEDIATE FOCAL LENGTH | TELE-PHOTO END |
|---|---|---|---|
| FOCAL LENGTH f | 16.146 | 29.486 | 53.852 |
| VARIABLE DA | 1.00003 | 10.71413 | 26.85616 |
| VARIABLE DB | 3.49515 | 3.27157 | 4.27495 |
| VARIABLE DC | 18.58004 | 8.07056 | 2.49995 |
| VARIABLE DD | 26.45879 | 3.30413 | 1.64995 |
| VARIABLE DE | 26.45879 | 38.93855 | 51.55163 |
| Bf | 0.50000 | 0.50000 | 0.50000 |

The values in the conditions (1), (2) are as follows.
Lt=128.1
φ=38.6
Disw=−4.37%
Y'=14.3
Fw=16.146
Ft=53.852
Fm: √(Fw×Ft)=29.486
In this case, the values in the condition (3) are as follows.
Twm=7.425
Twt=29.96
Fw=16.146
Ft=53.852
Fm=√(Fw×Ft)=29.486

Figure 22:
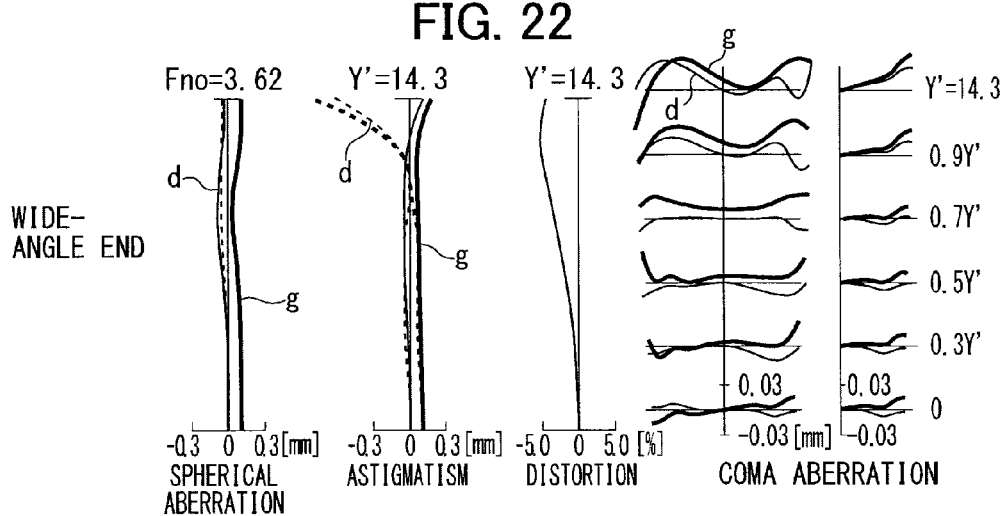
FIG. 22 is an aberration curve view at the wide-angle end of the zoom lens in Example 6.
Figure 23:
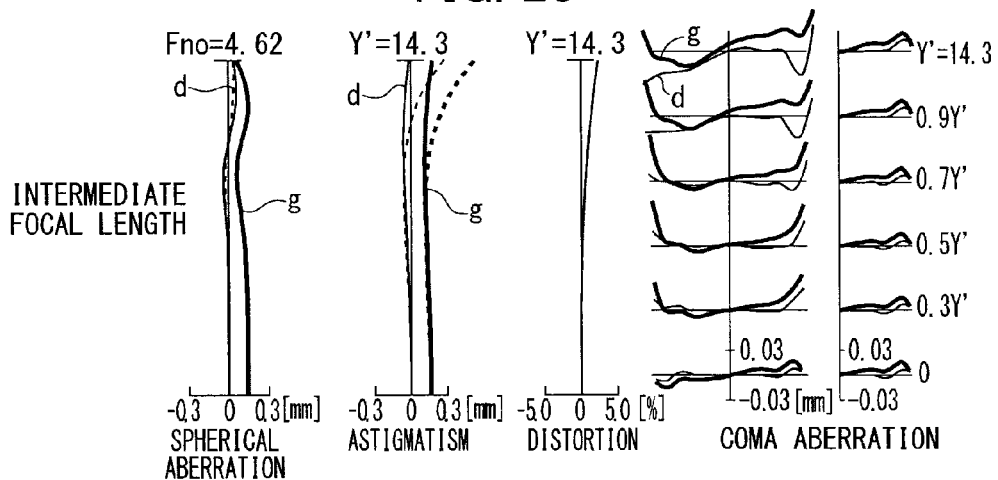
FIG. 23 is an aberration curve view at the intermediate focal length of the zoom lens in Example 6.
Figure 24:
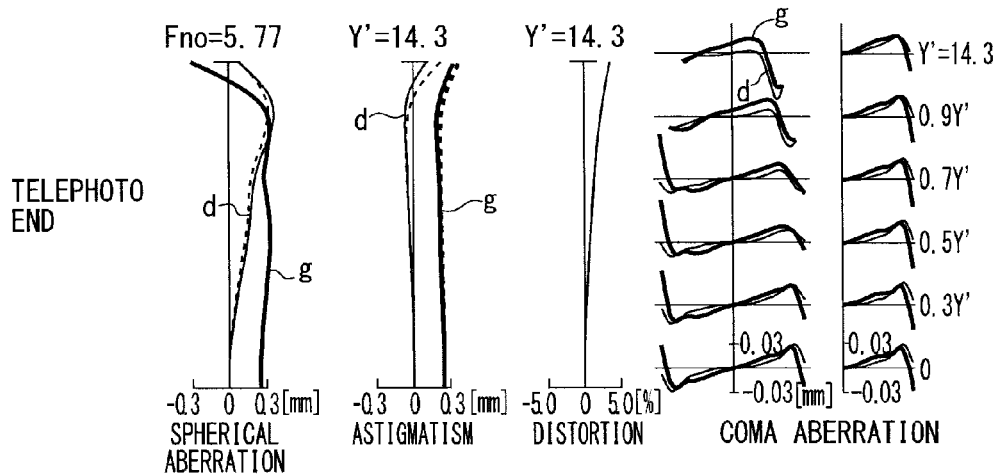
FIG. 24 is an aberration curve view at the telephoto end of the zoom lens in Example 6.

FIGS. 22, 23, 24 provide aberration views of spherical aberration, astigmatism, distortion and coma aberration at the wide-angle end, intermediate focal length and telephoto end in Example 6. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Example 7

Figure 25:
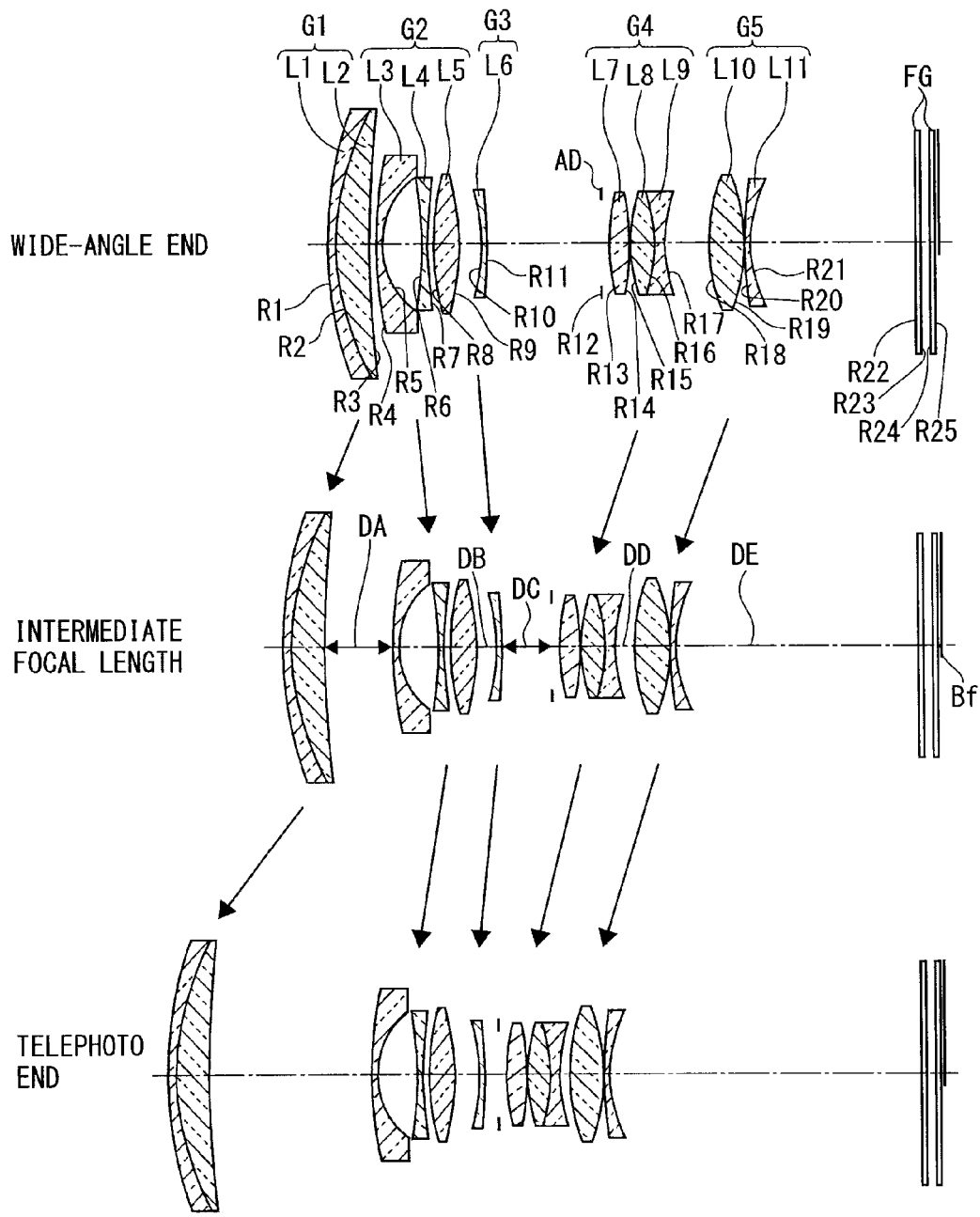
FIG. 25 is a sectional view illustrating the constitution of a zoom lens in Example 7 according to the first, second and fourth embodiments of the present invention.

FIG. 25 is a view schematically illustrating the lens constitution of the optical system of the zoom lens in Example 7 according to the first, second and fourth embodiments of the present invention, and the zooming trajectory along the zooming from the wide-angle end to the telephoto end through a predetermined intermediate focal length. In FIG. 25, the upper view is a sectional view illustrating the constitution of the zoom lens at the short focal end, namely, the wide-angle end, the middle view is a sectional view illustrating the constitution of the zoom lens at a predetermined intermediate focal length and the lower view is a sectional view illustrating the constitution of the zoom lens at a long focal end, namely, the telephoto end. In FIG. 25 illustrating the lens group arrangement of Example 7, the left side is an object (subject) side.

The zoom lens illustrated in FIG. 25 includes, in order from the object side along the optical axis, a first lens group G1 having a positive refractive power, a second lens group G2 having a negative refractive power, a third lens group G3 having a negative refractive power, a fourth lens group G4 having a positive refractive power, a fifth lens group G5 having a positive refractive power and an aperture stop AD between the third and fourth lens groups G3, G4.

The first lens group G1 includes, in order from the object side, a first lens L1 and second lens L2. The second lens group G2 includes, in order from the object side, a third lens L3, fourth lens L4 and fifth lens L5. The third lens group G3 includes a single sixth lens L6. The fourth lens group G4 includes, in order from the object side, a seventh lens L7, eighth lens L8 and ninth lens L9. The fifth lens group G5 includes, in order from the object side, a tenth lens L10 and eleventh lens L11.

Each of the first to fifth lens groups G1-G5 is appropriately supported by a supporting frame which is common to each of the lens groups, and integrally moves in zooming. FIG. 25 includes surface numbers R1-R25 of the respective optical surfaces. Each reference number in FIG. 25 is independently used for each example in order to avoid a complicated description due to an increase in the number of reference numbers, so that the constitution is not always common to another example even if the reference numbers common to another embodiment are used.

In the case of changing a magnification from the wide-angle end (short focal end) to the telephoto end (long focal end), the entire groups of the first to fifth lens groups G1-G5 are moved, so that the interval between the first and second lens groups G1, G2 is increased, the interval between the second and third lens groups G2, G3 is increased after being decreased once, the interval between the third and fourth lens groups G3, G4 is decreased, and the interval between the fourth and fifth lens groups G4, G5 is decreased. The aperture stop AD operates together with the fourth lens group G4.

The first lens group G1 includes, in order from the object side, the first lens L1 made of a negative meniscus lens having a convex surface on the object side and the second lens L2 made of a positive meniscus lens having a convex surface on the object side. The two lenses of the first lens L1 and the second lens L2 are cemented to form a cemented lens made of the two lenses.

The second lens group G2 includes, in order from the object side, the third lens L3 made of a negative meniscus lens having a convex surface on the object side, the fourth lens L4 made of a biconcave lens having an aspheric surface on both surfaces and a concave surface on the image side, which is stronger than that on the object side, and the fifth lens L5 made of a biconvex lens.

The third lens group G3 includes the single sixth lens L6 made of a negative meniscus lens having a concave surface on the object side.

The aperture stop AD is arranged between the third lens group G3 and the fourth lens group G4, and operates together with the fourth lens group G4 as described above.

The fourth lens group G4 includes, in order from the object side, the seventh lens L7 made of a biconvex lens having an aspheric surface on both surfaces and a convex surface on the object side, which is stronger than that on the image side, the eighth lens L8 made of a biconvex lens having the same convex surface on both surfaces, and the ninth lens L9 made of a biconcave lens having the same concave surface on both surfaces. The two lenses of the eighth and ninth lenses L8, L9 are cemented to form the cemented lens made of the two lenses.

The fifth lens group G5 includes, in order from the object side, the tenth lens L10 made of a biconvex lens having an aspheric surface on both surfaces and a convex surface on the object side, which is stronger than that on the image side, and the eleventh lens L11 made of a negative meniscus lens having a convex surface on the object side.

In this case, as illustrated in FIG. 25, in the case of changing a magnification from the wide-angle end (short focal end) to the telephoto end (long focal end), the first lens group G1 monotonically moves from the image side to the object side.

In Example 7, the focal length of the entire optical system f, F-number F and half-field angle ω change in accordance with the zooming in the ranges of f=16.146-29.487-53.852, F=3.61-4.61-5.76 and ω=42.9-25.4-14.4. The optical properties of each optical element in Example 7 are as shown in the following Table 13.

TABLE 13

OPTICAL PROPERTY

| SURFACE NUMBER | CURVATURE RADIUS R | SURFACE INTERVAL D | Nd | vd | REMARK | |
|---|---|---|---|---|---|---|
| 1 | 53.02258 | 1.31000 | 1.84666 | 23.78 | L1 | G1 |
| 2 | 35.94362 | 5.46329 | 1.77250 | 49.60 | L2 | |
| 3 | 188.67998 | VARIABLE DA | | | | |
| 4 | 54.87412 | 0.95512 | 2.00100 | 29.13 | L3 | G2 |
| 5 | 10.79646 | 6.44587 | | | | |
| 6* | −51.91885 | 0.80000 | 1.74320 | 49.29 | L4 | |
| 7* | 40.63394 | 1.06371 | | | | |
| 8 | 31.38598 | 4.08243 | 1.84666 | 23.78 | L5 | |
| 9 | −31.38598 | VARIABLE DB | | | | |
| 10 | −23.00149 | 0.80000 | 1.65160 | 58.55 | L6 | G3 |
| 11 | −97.40089 | VARIABLE DC | | | | |
| 12 | APERTURE STOP(∞) | 1.39999 | | | AD | |
| 13* | 19.57334 | 3.29549 | 1.51633 | 64.06 | L7 | G4 |
| 14* | −25.26589 | 0.10000 | | | | |
| 15 | 19.46405 | 3.89071 | 1.51742 | 52.43 | L8 | |
| 16 | −19.46405 | 1.40519 | 1.83400 | 37.16 | L9 | |
| 17 | 19.46405 | VARIABLE DD | | | | |
| 18* | 19.69818 | 5.60000 | 1.58913 | 61.15 | L10 | G5 |
| 19* | −22.10614 | 0.10000 | | | | |
| 20 | 38.97349 | 0.80019 | 1.90366 | 31.32 | L11 | |
| 21 | 15.14672 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf(VARIABLE) | | | | |

In Table 13, the lens surface having a surface number with * (asterisk) is an aspheric surface. This is the same as in other examples.

Namely, in Table 13, each of the sixth, seventh, thirteenth, fourteenth, eighteenth and nineteenth surfaces with * is an aspheric surface. The parameters (aspheric surface coefficient) of each aspheric surface in Equation 1 are as follows. In addition, in the aspheric surface parameters, En denotes $\times 10^n$, and for example, E-05 denotes $\times 10^{-5}$. These are the same as in other examples.

Aspheric Surface Parameter
Sixth Surface
K=0
$A_4$=3.46877E-05
$A_6$=−1.27443E-06
$A_8$=1.11921E-08
$A_{10}$=−4.40045E-11
Seventh Surface
K=0
$A_4$=6.8617E-06
$A_6$=−1.34447E-06
$A_8$=1.13537E-08
$A_{10}$=−4.81564E-11
Thirteenth Surface
K=0
$A_4$=−1.2513E-06
$A_6$=−4.84014E-08
$A_8$=5.40686E-09
$A_{10}$=−2.0620E-10
Fourteenth Surface
K=0
$A_4$=2.71708E-05
$A_6$=−2.3373E-07
$A_8$=9.93932E-09
$A_{10}$=−2.54318E-10
Eighteenth Surface
K=−0.65075
$A_4$=−1.90482E-05
$A_6$=−3.34777E-08
$A_8$=−1.71693E-09
$A_{10}$=−5.56274E-12
Nineteenth Surface
K=−0.20854
$A_4$=3.63343E-05
$A_6$=2.45318E-08
$A_8$=−2.95008E-09

In Example 7, the focal length of the entire optical system f, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and FG such as a filter, and the variable interval such as back-focusing BF between FG such as a filter and the image plane are changed as shown in the following Table 14 in the zooming.

TABLE 14

VARIABLE INTERVAL

| | WIDE-ANGLE END | INTERMEDIATE FOCAL LENGTH | TELE-PHOTO END |
|---|---|---|---|
| FOCAL LENGTH f | 16.146 | 29.487 | 53.852 |
| VARIABLE DA | 1.00003 | 10.81399 | 27.00555 |
| VARIABLE DB | 3.56892 | 3.23901 | 4.21342 |
| VARIABLE DC | 18.19944 | 7.95884 | 2.50002 |
| VARIABLE DD | 7.23212 | 3.33550 | 1.65001 |
| VARIABLE DE | 26.76503 | 39.32439 | 52.06792 |
| Bf | 0.50000 | 0.50000 | 0.50000 |

The values in the conditions (1), (2) are as follows.
Lt=128.35
φ=38.4
Disw=−4.8%
Y'=14.3

Fw=16.146
Ft=53.852
Fm: √(Fw×Ft)=29.487
In this case, the values in the condition (3) are as follows.
Twm=7.904
Twt=30.67
Fw=16.146
Ft=53.852
Fm=√(Fw×Ft)=29.487

FIGS. 26, 27, 28 provide aberration views of spherical aberration, astigmatism, distortion and coma aberration at the wide-angle end, intermediate focal length and telephoto end in Example 7. In each of the aberration views, the dashed line in the spherical aberration view illustrates a sine condition, and the solid line and the dashed line in the astigmatism view illustrate sagittal and meridional, respectively. In addition, g and d in the views illustrate g-line and d-line, respectively. These are the same as the aberration views in other examples.

Accordingly, the values of the condition (3) in each of the above-described Examples 1-7 are as shown in the following Table 15.

TABLE 15

The values of condition (3)

|  | CONDITION |
|---|---|
| EXAMPLE 1 | 0.275 |
| EXAMPLE 2 | 0.282 |
| EXAMPLE 3 | 0.270 |
| EXAMPLE 4 | 0.188 |
| EXAMPLE 5 | 0.255 |
| EXAMPLE 6 | 0.248 |
| EXAMPLE 7 | 0.258 |

As shown above, in each of the zoom lenses in Examples 1-7, the values of the parameters according to the condition (3) are within the condition (3).

The values of the parameters of the conditions (1), (2) in Examples 1-7 are as shown in the following Table 16.

TABLE 16

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| CONDITION(1) | 0.012 | 0.014 | 0.013 | 0.012 | 0.013 | 0.013 | 0.015 |
| CONDITION(2) | 0.003 | 0.004 | 0.004 | 0.003 | 0.004 | 0.004 | 0.004 |

As is apparent from Table 16, each zoom lens in Examples 1-7 satisfies the conditions (1), (2).

In each of Examples 1-7, the most object side lens in the first lens group includes the maximum lens effective diameter φ.

In each of the zoom lenses in Examples 1-7, the focusing is performed by the movement of the third lens group, and the focusing to the close distance object from the focused state to the infinity object is performed by moving the third lens group on the object side.

Fifth Embodiment

Figure 29:
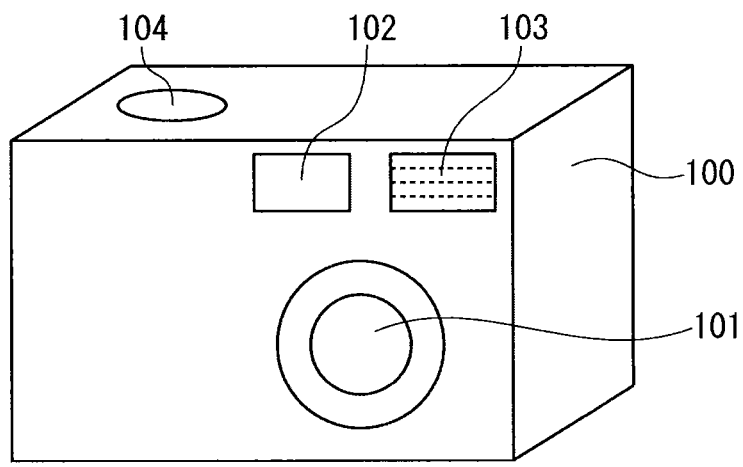
FIG. 29 is a perspective view illustrating an external appearance of a digital camera as an imaging device according to a third embodiment of the present invention as seen from the object side of the digital camera.
Figure 30:
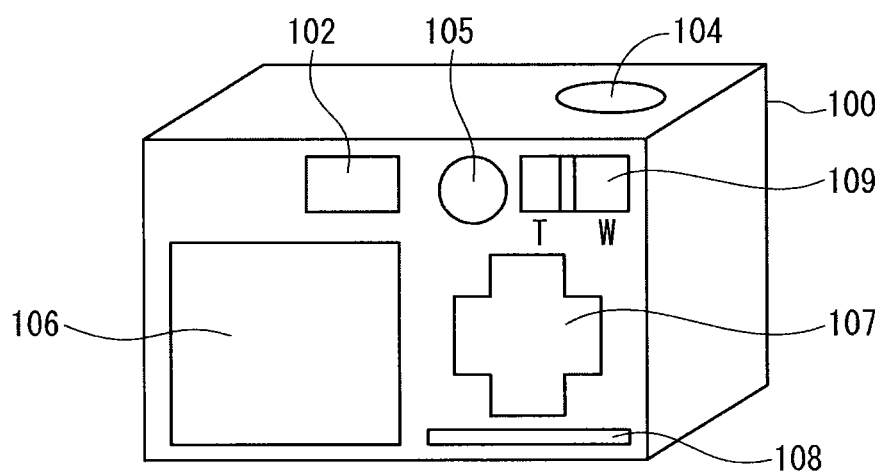
FIG. 30 is a perspective view illustrating the external appearance of the digital camera in FIG. 29 as seen from a photographer's side.
Figure 31:
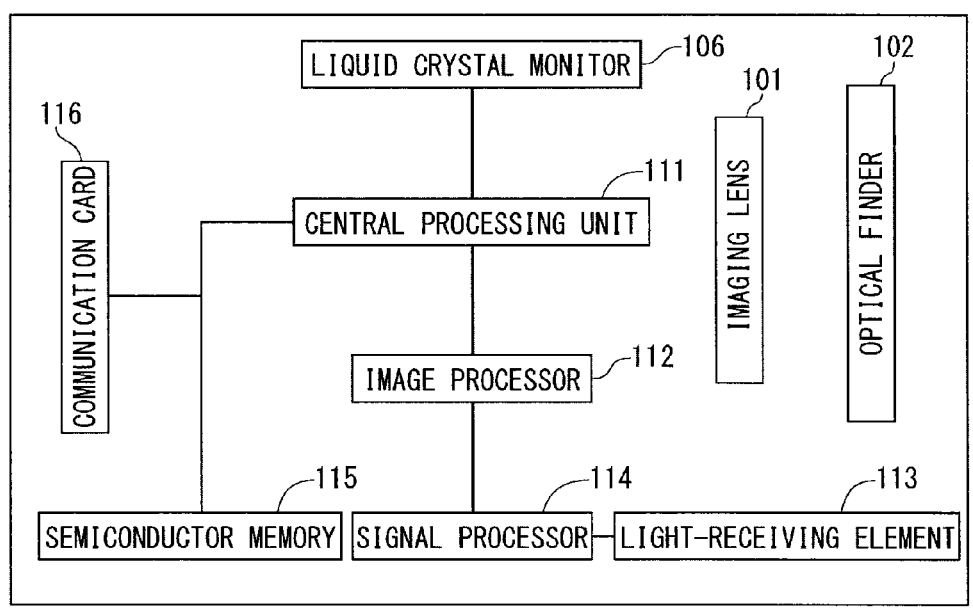
FIG. 31 is a block diagram schematically illustrating a functional constitution of the digital camera in FIGS. 29, 30.

Next, an imaging device according to the fifth embodiment of the present invention will be described with reference to FIGS. 29-31. The imaging device according to the fifth embodiment of the present invention adopts as an optical system for shooting the zoom lens as described in Examples 1-7 according to the first, second and fourth embodiments of the present invention. FIG. 29 is a perspective view illustrating an external appearance of a digital camera as the imaging device according to the fifth embodiment of the present invention as seen from the object side. FIG. 30 is a perspective view illustrating the external appearance of the digital camera as seen from a photographer's side. FIG. 31 is a block diagram illustrating the constitution of the digital camera. FIGS. 29-31 illustrate the digital camera as the imaging device. The imaging function corresponding to a digital camera, for example, is often incorporated not only into an imaging device including a video camera, a film camera using a so-called silver salt film, or the like, but also into a personal digital assistant referred to as a mobile phone and also various information devices including a personal digital assistant such as a smart-phone. Such an information device has an external appearance different from that of a digital camera or the like, but has a function and constitution which are substantially similar to those in a digital camera or the like.

As illustrated in FIGS. 29, 30, the digital camera includes in a camera body 100 an imaging lens 101, optical finder 102, strobe (electronic flush light) 103, shutter button 104, power source switch 105, liquid crystal monitor 106, operation button 107, memory card slot 108, and zoom switch 109. Moreover, as illustrated in FIG. 31, the digital camera includes in the camera body 100 a central processing unit (CPU) 111, image processor 112, light-receiving element 113, signal processor 114, semiconductor memory 115 and communication card 116.

The digital camera includes the imaging lens 101 as the optical system for shooting and the light-receiving element 113 as an image sensor by using a COMS imaging element or CCD imaging element. The subject optical image imaged by the imaging lens 101 is read by the light-receiving element 113. As the imaging lens 101, the zoom lens according to the first, second and fourth embodiments of the present invention described in Embodiments 1-7 is used.

The output of the light-receiving element 113 is processed by the signal processor 114 which is controlled by the central processing unit 111 to be converted into digital image information. After a predetermined image process is performed to the image information digitized by the single processor 114 in the image processor 112 which is controlled by the central processing device 111, the image information is recorded in the semiconductor memory 115 such as an involatile memory. In this case, the semiconductor memory 115 can be a memory which is provided in the memory card slot 108 or a semiconductor memory built in the digital camera main body. An image in shooting or an image recorded in the semiconductor memory 115 can be displayed on the liquid crystal monitor 106. The image recorded in the semiconductor memory 115 can be sent outside through a communication card 116 or the like provided in a not shown communication slot (memory card slot 108 can be used as this communication slot).

When the camera is carried, the object surface of the imaging lens 101 is covered by a not shown lens barrier. The lens barrier opens in response to the turning-on operation of the power source switch 105 by a user, and the object surface is exposed. In this case, the optical system of each group constituting the zoom lens inside the lens barrel of the imaging lens 101 is arranged at the wide-angle end (short focal end), for example. Upon the operation of the zoom switch 109, the arrangement of the optical system of each group is changed, so that the changing magnification operation to the telephoto end (long focal end) through the intermediate focal length can be performed. In addition, it is preferable for the optical system of the optical finder 102 to change a magnification in response to the change in the angle of view of the imaging lens 101.

In many cases, the focusing is made in response to the half-pressing operation of the shutter button 104. The focusing by the zoom lens according to the first, second and fourth embodiments of the present invention (zoom lens described in Embodiments 1-7) is performed in accordance with the movement of a part of the lens groups constituting the zoom lens. The shooting is made in response to the full-pressing operation of the shutter button 104, and the above process is performed after that.

The operation button 107 is operated as defined for displaying the image recorded in the semiconductor memory 115 on the liquid crystal monitor 106, or sending the image outside through the communication card 116 or the like. The semiconductor memory 115, communication card 116 or the like is provided in a dedicated or common slot such as the memory card slot 108 or the communication card slot.

In the imaging device such as the above-described digital camera or the information device having a similar imaging function, the imaging lens 101 made of the zoom lens described in, for example, the first, second and fourth embodiments (Embodiments 1-7) can be used as an optical system for shooting. Therefore, the imaging device such as the high-performance and compact digital camera using a light-receiving element having more than ten million pixels, or the information device such as a personal digital assistant or the like having a similar imaging function can be achieved.

The constitution of the zoom lens according to the first, second and fourth embodiments of the present invention is applicable for an imaging lens of a conventional film camera or a projection lens of a projector.

According to the embodiments of the present invention, a zoom lens which is especially suitable for a zoom lens for a compact and high-performance digital camera can achieve a high-speed AF, a small driving system for AF and a resolution corresponding to an imaging element more than ten million pixels, and a compact and high-performance information device using such a zoom lens can be obtained.

Although the embodiments of the present invention have been described above, the present invention is not limited thereto. It should be appreciated that variations may be made in the embodiments described by persons skilled in the art without departing from the scope of the present invention.

What is claimed is:

1. A zoom lens, comprising: in order from an object side to an image side along an optical axis,
    a first lens group having a positive refractive power;
    a second lens group having a negative refractive power;
    a third lens group having a negative refractive power;
    a fourth lens group having a positive refractive power;
    a fifth lens group having a positive refractive power; and
    an aperture stop between the third and fourth lens groups, wherein
    all of the lens groups are moved such that, in the case of changing a magnification from a wide-angle end to a telephoto end, an interval between the first and second lens groups is increased, an interval between the second and third lens groups is increased, an interval between the third and fourth lens groups is decreased, and an interval between the fourth and fifth lens groups is decreased,
    the focusing is performed by displacement of the third lens group,
    the third lens group includes one negative lens,
    at least one aspheric surface is provided on the object side of the aperture stop and the image side of the aperture stop, and
    an entire optical length at the telephoto end Lt, a maximum distortion at the wide-angle end Disw, an image height Y', a focal length of the entire system at the wide-angle end Fw, a focal length of the entire system at the telephoto end Ft, a geometric average of Fw and Ft Fm $\{=[[\sqrt{\,}]](Fw \times Ft)^{1/2}\}$, and a maximum effective diameter of a lens $\phi$ satisfy the following conditions (1), (2)

$$0.01 < |(Lt \times Disw)/(Y' \times Fm)| < 0.02 \quad (1)$$

$$0.001 < |(\phi \times Disw)/(Y' \times Fm)| < 0.01 \quad (2).$$

2. The zoom lens according to claim 1, wherein the second, fourth and fifth lens groups include the aspheric surface.

3. An information device having a shooting function comprising the zoom lens according to claim 1 as an optical system for shooting.

4. The information device according to claim 3, wherein an object image by the zoom lens is imaged on a light-receiving surface of an imaging element.

5. The information device according to claim 4 which is constituted as a personal digital assistant.

6. A zoom lens, comprising: in order from an object side to an image side along an optical axis,
    a first lens group having a positive refractive power;
    a second lens group having a negative refractive power;
    a third lens group having a negative refractive power;
    a fourth lens group having a positive refractive power; and
    a fifth lens group having a positive refractive power, wherein
    in the case of changing a magnification from the wide-angle end to the telephoto end,
    an interval between the first and second lens groups is gradually increased, an interval between the second and third lens groups is changed, an interval between the third and fourth lens groups is gradually decreased, and an interval between the fourth and fifth lens groups is gradually decreased,
    the focusing is performed by the third lens group,
    the third lens group consists of one negative lens, and
    the following condition (3) is satisfied where a displacement of the first lens group from the wide-angle end to the intermediate focal length Fm is Twm and a displacement of the first lens group from the wide-angle end to the telephoto end is Twt, in this case, the intermediate focal length Fm is Fm=$[[\sqrt{\,}]](Fw \times Ft)^{1/2}$ where a focal length at the wide-angle end is Fw and a focal length at the telephoto end is Ft, $$0.1 < Twm/Twt < 0.4 \quad (3).$$

7. The zoom lens according to claim 6, wherein an aperture stop is provided between the third and fourth lens groups.

8. The zoom lens according to claim 6, wherein the first lens group monotonically moves in accordance with a change in a magnification from the wide-angle end to the telephoto end.

9. The zoom lens according to claim 6, wherein at least one of the second, fourth and fifth lens groups includes an aspheric surface in one lens or more.

10. An information device comprising the zoom lens according to claim 6 as an optical system for shooting.

11. The information device according to claim 10 which is constituted as a personal digital assistant.

12. A zoom lens, comprising: in order from an object side to an image side along an optical axis, a first lens group having a positive refractive power;

a second lens group having a negative refractive power;

a third lens group having a negative refractive power;

a fourth lens group having a positive refractive power; and a fifth lens group having a positive refractive power, wherein all of the lens groups are moved such that, in the case of changing a magnification from the wide-angle end to the telephoto end, an interval between the first and second lens groups is increased, an interval between the second and third lens groups is increased, an interval between the third and fourth lens groups is decreased, and an interval between the fourth and fifth lens groups is decreased, the focusing is performed by displacement of the third lens group, and an entire optical length at the telephoto end Lt, a maximum distortion at the wide-angle end Disw, an image height Y', a focal length of the entire system at the wide-angle end Fw, a focal length of the entire system at the telephoto end Ft, an intermediate focal length Fm=[[√]] $(Fw \times Ft)^{1/2}$, and a maximum effective diameter of a lens φ satisfy the following conditions (1), (2)

$$0.01 < |(Lt \times Disw)/(Y' \times Fm)| < 0.02 \quad (1)$$

$$0.001 < |(\phi \times Disw)/(Y' \times Fm)| < 0.01 \quad (2).$$

13. The zoom lens according to claim 12, wherein the following condition (3) is satisfied where a displacement of the first lens group from the wide-angle end to the intermediate focal length Fm is Twm and a displacement of the first lens group from the wide-angle end to the telephoto end is Twt, $$0.1 < Twm/Twt < 0.4 \quad (3).$$

14. The zoom lens according to claim 12, wherein the third lens group includes a single negative lens.

15. The zoom lens according to claim 12, wherein an aperture stop is arranged between the third and fourth lens groups.

16. The zoom lens according to claim 15, wherein at least one aspheric surface is provided on the object side of the aperture stop and the image side of the aperture stop.

17. The zoom lens according to claim 12, wherein the first lens group monotonically moves in accordance with a change in a magnification from the wide-angle end to the telephoto end.

18. An information device comprising the zoom lens according to claim 12 as an optical system for shooting.

19. The information device according to claim 18 which is constituted as a personal digital assistant.

* * * * *